(12) United States Patent
Mort et al.

(10) Patent No.: US 11,970,678 B2
(45) Date of Patent: Apr. 30, 2024

(54) SYSTEM AND METHOD FOR THE RAPID AGING OF A DISTILLED ETHYL ALCOHOL WITH RF ENERGY AND WOOD MATERIAL SUPPORTING PLATFORM

(71) Applicant: RF Kettle Company, LLC, Fletcher, NC (US)

(72) Inventors: Keith A Mort, Fletcher, NC (US); Chadwick E Slagle, Black Mountain, NC (US)

(73) Assignee: RF Kettle Company, LLC, Fletcher, NC (US)

( * ) Notice: Subject to any disclaimer, the term of this patent is extended or adjusted under 35 U.S.C. 154(b) by 0 days.

(21) Appl. No.: 18/110,250

(22) Filed: Feb. 15, 2023

(65) Prior Publication Data
US 2023/0193174 A1    Jun. 22, 2023

Related U.S. Application Data

(60) Division of application No. 17/868,667, filed on Jul. 19, 2022, now Pat. No. 11,629,317, which is a
(Continued)

(51) Int. Cl.
*C12H 1/16* (2006.01)
*C12G 3/07* (2006.01)
(Continued)

(52) U.S. Cl.
CPC .............. *C12H 1/165* (2013.01); *C12G 3/07* (2019.02); *C12H 6/02* (2019.02); *H05B 6/78* (2013.01); *H05B 6/80* (2013.01); *H05B 6/802* (2013.01)

(58) Field of Classification Search
None
See application file for complete search history.

(56) References Cited

U.S. PATENT DOCUMENTS

| 2,807,547 A | 9/1957 | Nickol |
| 3,673,370 A | 6/1972 | Johnson |
| (Continued) | | |

FOREIGN PATENT DOCUMENTS

| CN | 102433241 | 5/2012 |
| CN | 102965241 | 3/2013 |
| (Continued) | | |

OTHER PUBLICATIONS

Translation of KR-20120073594-A (Year: 2012).*

*Primary Examiner* — Elizabeth M Kerr
(74) *Attorney, Agent, or Firm* — Daniel W. Roberts; Law Offices of Daniel W. Roberts, LLC

(57) ABSTRACT

Provided is a system and method for rapid aging of distilled ethyl alcohol. The system includes a vessel with at least one aperture for introducing RF energy at a preselected frequency to be absorbed by opaque material in a target area; at least one liquid circulating system; and a platform to substantially contain a plurality of units of wood as the opaque material. Each unit of wood has a plurality of capillaries containing at least wood sugar and resin. The system has a wood agitation system to move the wood through the target area. An RF generator provides constant RF energy at the predetermined frequency to induce oscillation of molecules within the wood. The system has an oxygenator to provide oxygen into the liquid mixture and outgas congeners from the liquid, the vessel further providing at least one vent structured and arranged to vent the outgassed congeners.

17 Claims, 20 Drawing Sheets

Related U.S. Application Data continuation-in-part of application No. 14/160,017, filed on Jan. 21, 2014, now abandoned.

(51) Int. Cl.
  *C12H 6/02* (2019.01)
  *H05B 6/78* (2006.01)
  *H05B 6/80* (2006.01)

(56) References Cited

U.S. PATENT DOCUMENTS

| | | | | |
|---|---|---|---|---|
| 4,073,955 | A | * | 2/1978 | Koppelman ............. C12H 1/22 426/493 |
| 4,350,708 | A | * | 9/1982 | Ruiz de Palacios .... A23L 27/11 426/429 |
| 9,523,068 | B2 | * | 12/2016 | Roleder ................... C12G 3/07 |
| 2011/0070331 | A1 | | 3/2011 | Watson et al. |
| 2015/0203802 | A1 | * | 7/2015 | Mort ....................... C12H 1/165 426/241 |
| 2018/0119076 | A1 | * | 5/2018 | Evans ...................... B27M 1/06 |
| 2018/0220500 | A1 | * | 8/2018 | Staton ................. H05B 6/6408 |

FOREIGN PATENT DOCUMENTS

| | | | |
|---|---|---|---|
| JP | S61146180 | 7/1986 | |
| KR | 20120073594 A | * 7/2012 | ............. H05B 6/802 |

\* cited by examiner

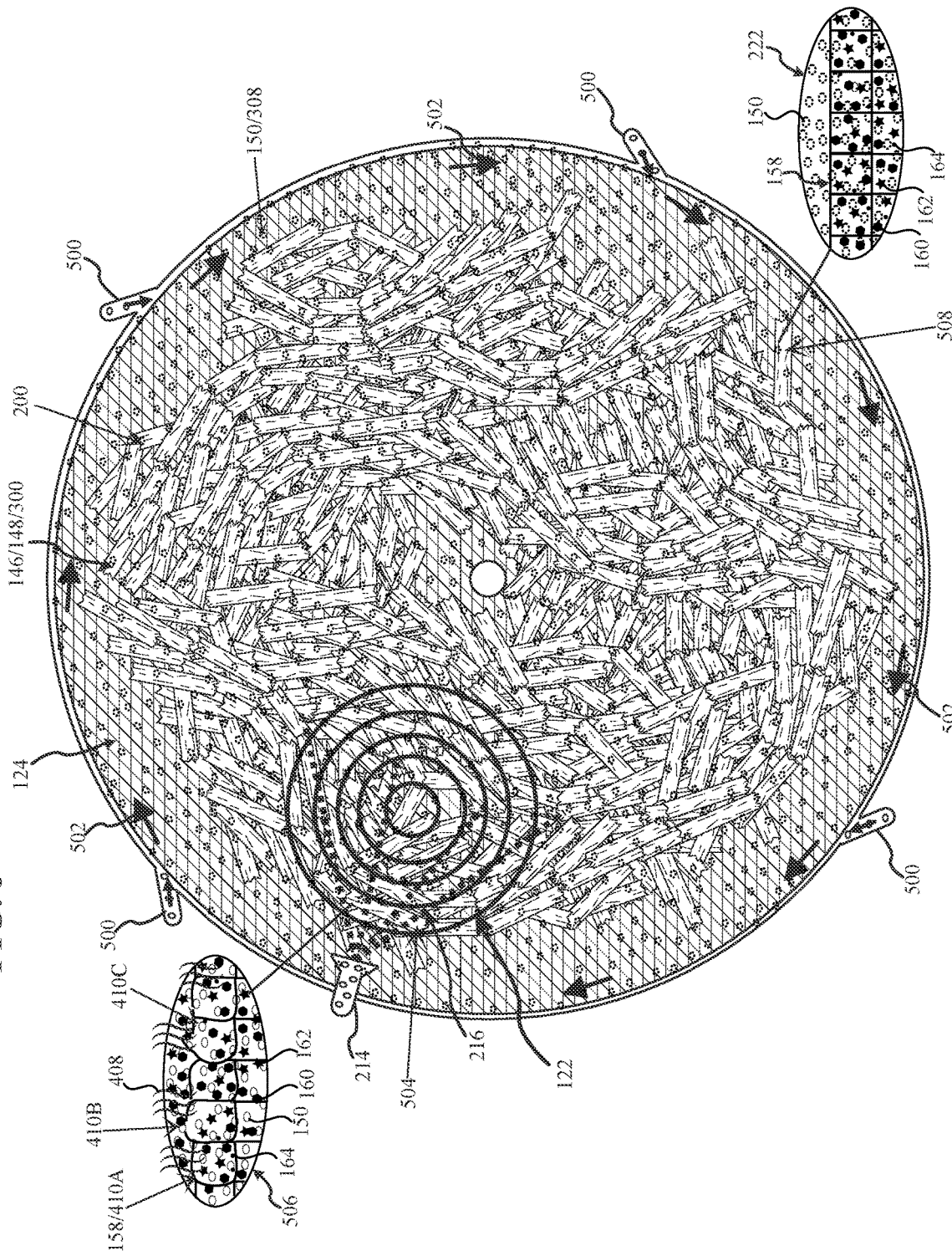

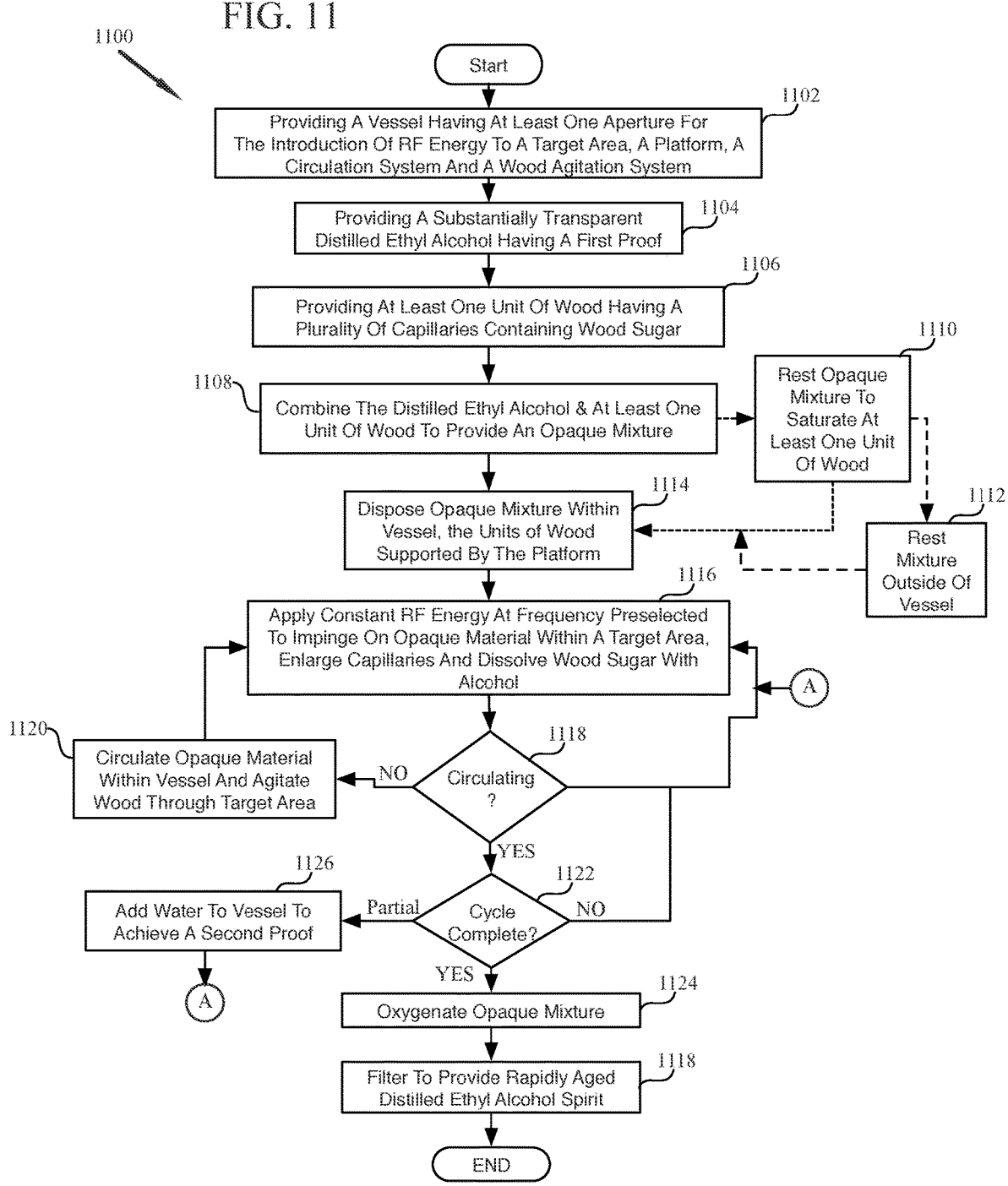

SYSTEM AND METHOD FOR THE RAPID AGING OF A DISTILLED ETHYL ALCOHOL WITH RF ENERGY AND WOOD MATERIAL SUPPORTING PLATFORM

CROSS-REFERENCE TO RELATED APPLICATIONS

The present application is a Divisional of co-pending U.S. application Ser. No. 17/868,667, filed Jul. 19, 2022 which is incorporated herein by reference. U.S. application Ser. No. 17/868,667 is a Continuation in Part of U.S. patent application Ser. No. 14/160,017 filed Jan. 21, 2014 and entitled METHOD AND ARRANGEMENT FOR HEATING OF LIQUIDS WA RF ENERGY, the disclosure of which is incorporated herein by reference. Moreover, this Continuation in Part application claims the benefit of the filing date of U.S. patent application Ser. No. 14/160,017 filed Jan. 21, 2014.

In addition, the following patent application is incorporated by reference herein in its entirety: U.S. patent application Ser. No. 17/516,544 filed Nov. 1, 2021 and entitled SYSTEM & METHOD FOR THE RAPID AGING OF A DISTILLED ETHYL ALCOHOL WITH RF ENERGY.

In further addition, the following patent application is incorporated by reference herein in its entirety: U.S. patent application Ser. No. 17/868,649 filed Jul. 19, 2022 and entitled SYSTEM AND METHOD FOR THE RAPID AGING OF A DISTILLED ETHYL ALCOHOL WITH RF ENERGY TO FRACTURE AND EXPAND WOOD CAPILARIES.

FIELD OF THE INVENTION

The present invention relates generally to systems and methods rapidly aging alcoholic beverages, and most specifically the rapid aging of distilled spirits.

BACKGROUND

Distilled spirits, such as brandy, bourbon, scotch, gin, tequila, rum, whiskey, and the like are traditionally produced by distilling batches of fermented liquid to recover the ethanol and produce a raw liquid, which in turn is then aged in wooden vessels or vessels with wooden chips for years, if not even decades. The varieties of wood, such as oak (American/European/Sessile/Mongolian/etc. . . . ), cherry, maple, ash, etc. . . . are often selected for the flavor elements that they will impart to the raw liquid during the aging process.

Although the raw liquid—also known as distilled ethyl alcohol—may be consumed in an "as is" state, it is rarely marketed as such. Indeed, the aging process has been found and appreciated to be beneficial for the enhancement of flavor, color and aroma. These improvements are so significant that great investments of time and money are commonly accepted as the norm for the distilled spirit industry.

The traditional goal is to create an enjoyable blend of water, ethanol, and organic compounds known as congeners which are substances other than alcohol or ethanol that are responsible for most of the taste and aroma of distilled alcoholic beverages. Although congeners may include many different substances, some desirable and others not, a key class are esters which are the result of chemical bonding of an alcohol or phenol to an acid, specifically a carboxylic or phenolic acid. Undesirable congeners are dissipated over time through the process of oxidation.

There are quite literally thousands of different esters which may be created, and their development is directed by the types of wood or woods used, and traditionally the nature of the starting raw liquid (is it to be a scotch, bourbon, whisky, rum, other), and the time provided for the aging process.

To some degree the aging process is a blend of myth and science—"if we do this, we will get that." Essentially, the long duration of the raw liquid resting within the wooden barrel or among saturated wood chips permits polymer chemistry to occur wherein elements of the wood intermix with the raw liquid and over time new compounds, such as esters, are created.

The traditional aging process involving wooden barrels is also subject to loss of eventual product through the natural process of evaporation. Oxidation is an important element of the spirit aging process, and as the wood allows air to enter, it also allows vapors to escape through the sides of the wooden barrel. Often referred to as the Angle Share, the aromatic aroma may well be enjoyed by visitors and employees, but it is the result of an undeniable loss of quantity of the developing aging spirit.

It is also noteworthy, that with respect to traditional aging process involving wooden barrels, the aging spirit is kept cool. In many instances efforts are even made to provide a consistent and uniform cool temperature. Thus, it is clear that although heating is a common element in the original creation of the distilled spirit, heat is not required to achieve desired aging qualities.

Moreover, long term aging is costly in both space and financial investment to maintain, protect and monitor the developing spirit.

Various parties have explored options to improve the process of making aged distilled spirits. According to U.S. Pat. No. 2,807,547 to Nickol, one known method of producing whisky includes preparing a barrel of white oak wood by chaffing the interior to an extent and depth established by practice. An aqueous-alcohol distillate (so-called high wine) derived from the fermentation of a cereal mash is introduced into the barrel which is then tightly sealed and held preferably under prescribed conditions of temperature and humidity for a period of years. During this time progressive changes occur, both in the extraction of certain constituents from the charred wood and in the reaction of other constituents originally present in the high wines, either with themselves or with constituents derived from the wood. Broadly speaking, the constituents which characterize the final product, in addition to the base of ethyl alcohol, are organic acids, aldehydes, oil, and organic esters together with coloring matter.

One disadvantage of the aging process, according to U.S. Pat. No. 2,807,547 to Nickol, is that the barrels can only be used once for the production of a satisfactory grade of whisky which adds substantially to the expense, and the cost of handling liquids in containers of such relatively small size as compared to these used in other industries which handle liquids, is relatively excessive. According to U.S. Pat. No. 2,807,547 to Nickol, attempts have been made to dispense with the use of the charred oak barrels by storing the high wines in containers of stainless steel for example, and adding to the high wines so stored an amount of charred oak chips corresponding in ratio to those which would be presented to the high wines in barrel-aging practice, or alternatively to add to the high wines so stored a corresponding amount of the extractives obtained by the aqueous ethyl alcohol extraction of charred wood chips. But, notes U.S. Pat. No. 2,807,547 to Nickol, these attempts have not been successful because, since the whisky is lacking certain essential flavoring constituents when an attempt is made to correct this condition by the use of a larger amount of charred chips or extractives derived therefrom, the resulting whisky is, according to U.S. Pat. No. 2,807,547 to Nickol, over-balanced in certain other constituents and is therefore of inferior grade.

U.S. Pat. No. 2,807,547 to Nickol proposes a distillation method via which it is no longer necessary to use wood barrels, and the aging can be carried out in drums of stainless steel or a similar material which can be re-used indefinitely or alternatively can be carried out in large vats or tanks of the same or similar material, with corresponding economies in storage and in transfer.

While U.S. Pat. No. 2,807,547 to Nickol points out the virtues of large scale handling of liquids treated in a distillation process, with such large scale handling including the use of drums or tanks each significantly larger than individual aging barrels, the distilling process still requires heating of the prepared liquid to produce vapor that can subsequently be cooled or condensed into a liquid state. The heating of large volume drums or tanks is often performed via gas-fueled heating elements which heat the drums or tanks themselves to thereby heat the prepared liquid retained in the drum or tank. This indirect heating approach thus leads to less than optimal energy conversion of the heating energy (BTU) of the gas-fuel combustion into thermal heating of the liquid contents of the drums or tanks, as the drums or tanks themselves heat up and do not completely transfer all of their heat content to the liquid contents. Also, the gas-fuel combustion approach can lead to scorching of the liquid contents, wherein some portions of the liquid are subjected to over-heating.

Far more recently, Wen, CN 102433241, has presented a method for fermenting blackberry wine by high-energy pulse microwave aging. Essentially, Wen is setting forth a method of improving the fermentation process by adding dry yeast to clear juice which is then gently fermented at 26-28 C.° —the heating achieved by the application of pulsed microwave energy. It will be understood and appreciated that the specific cap to the temperatures is to ensure that yeast killing temperatures are not generated. The use of pulse energy also helps to ensure that there is dissipation of the applied RF energy throughout the clear juice, whereas a continued application would likely result in temperatures well above the desired 26-28 C°.

Wen further describes that the aging of the wine is achieved, "Because the impact of the micro-wave energy that the high-frequency electromagnetic field-effect of microwave is produced has caused intensive concussion and friction between each quasi-molecule and molecule in the wine base; Moment has been destroyed all kinds of associated molecule crowds in the wine base; Rapidly part alcohol molecule, organic molecule group, water molecules are cut into individual molecule, be reassembled into relatively stable molecular grouping then, these new molecular groupings have improved the quality of fermented wine in varying degrees just." (translation from original Chinese).

In other words, Wen is clearly teaching the use of microwave energy to disrupt the molecules in the clear wine base—e.g., the alcohol molecules, but Wen is also clearly and carefully instructing that the micro-wave energy should not cause issue or harm to the added yeast. Moreover, Wen is using pulsed microwave energy to excite the dipoles of the alcohol or water of the clear wine base.

But as the teachings of Wen are so clearly focused upon the fermentation of clear wine base and some subsequent aging, the absence of wood—indeed the specific teaching of Wen let the juice stand to clarify and then filter to obtain a clear juice which is then the wine base subjected to the pulsed application of microwave energy attenuated to excite the dipoles of the wine, make Wen of no value in the quest for rapid aging of a distilled spirit—a product that while perhaps dependent upon an earlier process of fermentation, is now yeast free and is actually dependent upon the interaction of the distilled spirit with wood for the development of the coveted esters, for "age" and balance.

Hence there is a need for a method and system that is capable of overcoming one or more of the above identified challenges. And it is to innovations related to this subject matter that the claimed invention is generally directed.

SUMMARY

Our invention solves the problems of the prior art by providing a novel method and system for the rapid aging of a distilled ethyl alcohol, aka a distilled spirit for human consumption, with RF energy.

In particular, and by way of example only, according to one embodiment of the present invention, provided is a system for rapid aging of a distilled ethyl alcohol, including: a vessel including: at least one aperture suitable for the introduction of radio frequency (RF) energy at a preselected frequency selected to pass through transparent material and be absorbed by opaque material, the at least one aperture above a target area; at least one liquid circulating system structured and arranged to circulate a liquid from a lower portion of the vessel to an upper portion of the vessel; and a platform structured and arranged to substantially contain a plurality of units of wood as the opaque material proximate to a surface of the liquid within the vessel, each unit of wood having a plurality of capillaries containing at least wood sugar and resin, the capillaries defined by molecular bonds of molecules; a wood agitation system structed and arranged to move the plurality of units of wood below the aperture and through the target area; an RF generator structured and arranged to provide a constant RF energy at the predetermined frequency to induce oscillation of molecules within the opaque material disposed within the vessel; at least one waveguide disposed between the RF generator and the vessel, the at least one waveguide structured and arranged to convey the generated predetermined frequency from the RF generator to the at least one aperture; and an oxygenator structured and arranged to dispose oxygen within an opaque liquid mixture of ethyl alcohol and ethyl alcohol saturated units of wood disposed within the vessel and outgas congeners from the liquid, the vessel further providing at least one vent structured and arranged to vent the outgassed congeners.

In another embodiment, provided is a method for the rapid aging of distilled ethyl alcohol, including: providing a vessel having at least one aperture suitable for the introduction of radio frequency (RF) energy at a preselected frequency into the vessel in a target area, the vessel further providing a platform structured and arranged to substantially contain saturated wooden material below the at least one aperture, the vessel further providing a wood agitator structed and arranged to cycle saturated wooden material through the target area; providing a distilled ethyl alcohol having a first proof; providing a plurality of units of wood, each unit of wood having a plurality of capillaries containing at least wood sugar and resins, the capillaries defined by molecular bonds of molecules; combining the distilled ethyl alcohol and plurality of units of wood to provide an opaque mixture, the opaque mixture disposed within the vessel with the plurality of units of wood supported by the platform, the opaque mixture having a surface disposed below the at least one aperture; circulating at least the ethyl alcohol from a lower portion of the vessel to an upper portion of the vessel to continuously refresh the surface; cycling the units of wood through the target area; and applying a constant RF energy through the aperture at the preselected frequency, the applied constant RF energy exciting polar molecules of the capillaries of the units of wood within the target area to fracture and expand the capillaries, the fractured and expanded capillaries absorbing the alcohol of the distilled ethyl alcohol, the absorbed alcohol dissolving at least a portion of the wood sugars and resins into the distilled ethyl alcohol to rapidly age the distilled ethyl alcohol.

In yet another embodiment, provided is a method for the rapid aging of distilled ethyl alcohol, including: providing a vessel, including: at least one aperture suitable for the introduction of radio frequency (RF) energy at a preselected frequency selected to pass through transparent material and be absorbed by opaque material in a target area; at least one liquid circulating system structured and arranged to circulate a liquid from a lower portion of the vessel to an upper portion of the vessel; a platform structured and arranged to substantially contain a plurality of units of wood as the opaque material proximate to a surface of the liquid within the vessel, each unit of wood having a plurality of capillaries containing at least wood sugar and resin, the capillaries defined by molecular bonds of molecules; and a wood agitation system structed and arranged to move the plurality of units of wood below the aperture in the target area; providing a substantially transparent distilled ethyl alcohol having a first proof; providing at least one unit of wood having a plurality of capillaries containing wood sugar, the at least one unit of wood being opaque; combining the distilled ethyl alcohol and the at least one unit of wood to provide an opaque mixture, the opaque mixture disposed within the vessel upon the platform, the opaque mixture having a surface disposed below the at least one aperture; applying by the RF generator through the aperture, a constant RF energy at the preselected frequency, the applied constant RF energy expanding and fracturing the plurality of capillaries of the wood within the target area, the expanding and fracturing and expanded capillaries absorbing the alcohol of the distilled ethyl alcohol, the absorbed alcohol dissolving at least the wood sugars into the distilled ethyl alcohol to rapidly age the distilled ethyl alcohol; and using the wood agitation system to cycle the units of wood disposed substantially below the aperture in a targeted application area of the constant RF energy.

And yet for still another embodiment, provided is a system for rapid aging of a distilled ethyl alcohol, including: a vessel including: at least one aperture suitable for the introduction of radio frequency (RF) energy at a preselected frequency selected to pass through transparent material and be absorbed by opaque material within a target area; at least one liquid circulating system structured and arranged to circulate a liquid from a lower portion of the vessel to an upper portion of the vessel, the liquid circulating system including at least one angled return nozzle structured and arranged to induce rotation to the circulating liquid and at least one sprayer nozzle structed and arranged to spray circulating liquid into an area directly below the aperture; a platform structured and arranged to substantially contain a plurality of units of wood as the opaque material proximate to a surface of the liquid within the vessel, each unit of wood having a plurality of capillaries containing at least wood sugar and resin, the capillaries defined by molecular bonds of molecules; a wood agitation system structed and arranged to cycle the units of wood through the area directly below the aperture in the target area; an RF generator structured and arranged to provide a constant RF energy at the predetermined frequency to induce oscillation of polar molecules within the opaque material disposed within the vessel when the opaque material is within the target area; at least one waveguide disposed between the RF generator and the vessel, the at least one waveguide structured and arranged to convey the generated predetermined frequency from the RF generator to the at least one aperture; and an oxygenator structured and arranged to dispose oxygen within an opaque liquid mixture of ethyl alcohol and ethyl alcohol saturated units of wood disposed within the vessel and outgas congeners from the liquid, the vessel further providing at least one vent structured and arranged to vent the outgassed congeners.

BRIEF DESCRIPTION OF THE DRAWINGS

At least one method and system for the rapid aging of a distilled ethyl alcohol will be described, by way of example in the detailed description below with particular reference to the accompanying drawings in which like numerals refer to like elements, and:

FIG. 5 illustrates a top cut through view of the vessel shown in FIG. 1, of the rapid aging system and more specifically the vessel with a wood material supporting platform, showing the target area for application of constant RF energy and liquid circulation return to induce rotation and wet the opaque mixture in the target area in accordance with at least one embodiment of the present invention;

FIG. 11 illustrates a high-level flow diagram for a method of rapidly aging a distilled ethyl alcohol in accordance with at least one embodiment of the present invention;

DETAILED DESCRIPTION

Before proceeding with the detailed description, it is to be appreciated that the present teaching is by way of example only, not by limitation. The concepts herein are not limited to use or application with a specific method and system for the rapid aging of a distilled ethyl alcohol with the application of RF energy. Thus, although the instrumentalities described herein are for the convenience of explanation shown and described with respect to exemplary embodiments, it will be understood and appreciated that the principles herein may be applied equally in other types of systems and methods for method and system for the rapid aging of a distilled ethyl alcohol.

Figure 1:
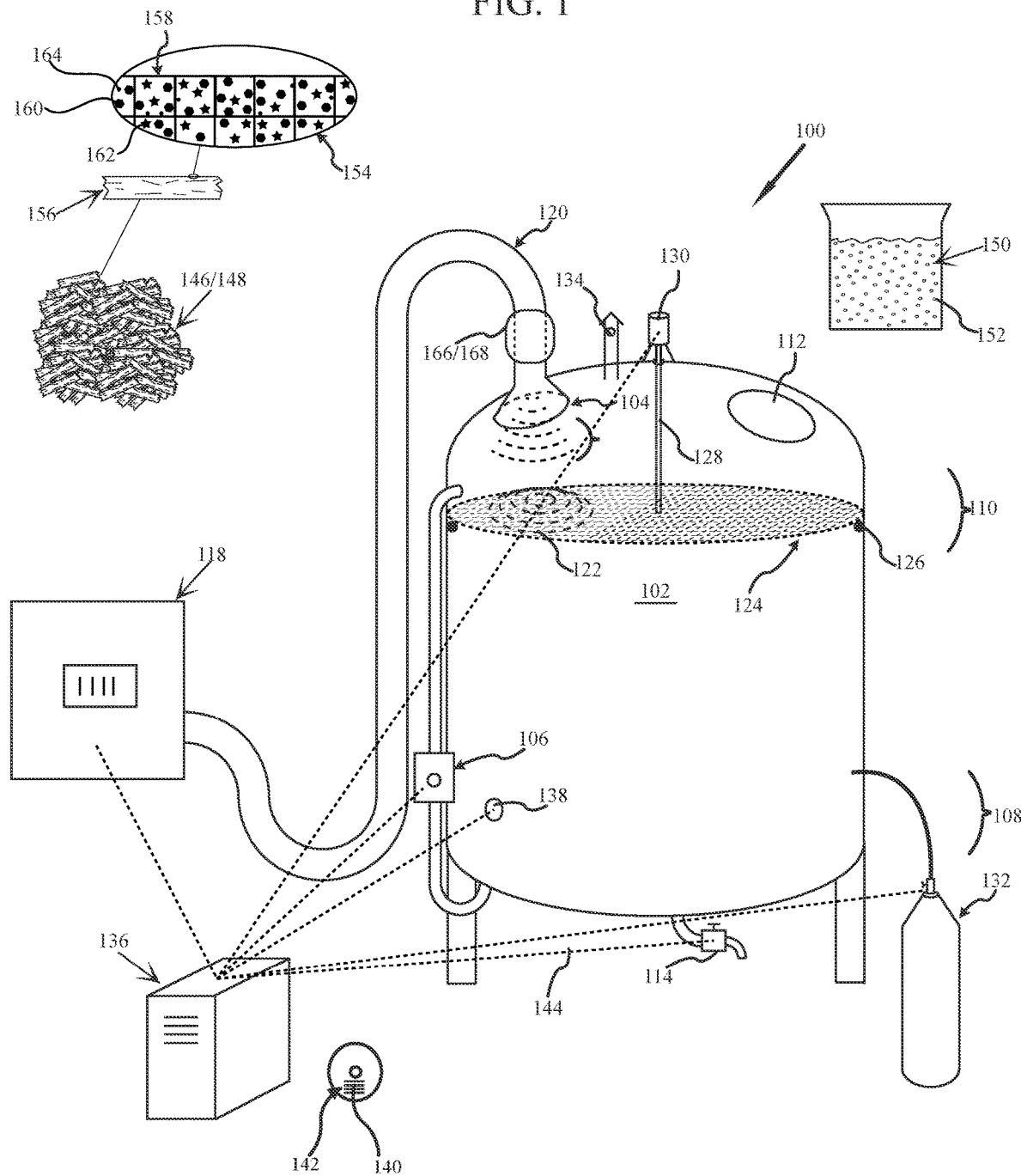
FIG. 1 illustrates a rapid aging system for the aging of a distilled ethyl alcohol with RF energy and a wood material supporting platform in accordance with at least one embodiment of the present invention.

Turning now to the drawings, and more specifically FIG. 1, illustrated is a high-level diagram of a Rapid Aging System 100, herein after RAS 100, in accordance with at least one embodiment of the present invention. It will be understood and appreciated that RAS 100 is a system for the rapid aging of distilled ethyl alcohol—aka, distilled drinking spirits or even just distilled spirits, but not exclusively limited to brandy, bourbon, scotch, gin, tequila, rum, whiskey, and the like with radio frequency (RF) energy.

Moreover, as is conceptually shown in FIG. 1, for at least one embodiment, RAS 100 comprises a vessel 102 having at least one aperture 104 suitable for the introduction of RF energy and at least one circulation system 106 structured and arranged to circulate liquid from a lower portion 108 of the vessel to an upper portion 110 of the vessel.

For at least one embodiment the vessel 102 also provides at least one access hatch 112 through which materials may be disposed into, or removed from, the vessel 102. The vessel 102 also has at least one drain 114 through which liquid may be extracted from the vessel 102. For at least one embodiment, the drain 114 may be incorporated as a component of the circulation system 106. The drain 114 may also have a pump (not shown) such that the liquid may be pumped from the vessel 102 at a rate greater than that expected from a typical gravity drain.

RAS 100 also includes at least one RF generator 116 structured and arranged to provide RF energy 118 at a predetermined frequency. The provided RF energy 118 is conveyed from the RF generator 116 to the at least one aperture 104 of the vessel 102 by at least one waveguide 120. The RF energy 118 generally applied in a target area 122 below each aperture 104. As is further discussed below, the RF generator provides electromagnetic radiation to the vessel. This electromagnetic radiation may be viewed as achieving localized heating, however the resulting heat is in actuality a byproduct of the intended purpose which is the fracturing and expanding of wood chips as is further described below. This fracturing and expanding is the result from traumatic localized heating of the wood chips 148 as discussed below, however it will be understood and appreciated that to view the system and methods disclosed herein as simply "heating" is a vastly improper oversimplification.

As is shown in dotted relief, RAS 100 also has at least one platform 124 disposed internally. In varying embodiments, this platform 124 may be a floating platform, meaning that it is structured and arranged to float on or within liquid disposed within the vessel 102, and/or there may be one or more internal supports, such as but not limited to an annular ring 126 to ensure that the platform 124 does not descend within the vessel 102 beyond a desired point.

For at least one embodiment, the relative height of the platform 124 within the vessel 102 may also be adjusted, such as by adjusting the length of a central shaft 128. For at least one embodiment the central shaft 128 may also be a drive shaft, mechanically coupled to an external motor 130. For at least a first embodiment the motor 130 is operable to rotate the entire platform 124 within the vessel 102. For yet a second embodiment, the motor 130 is operable to rotate at least one sweeper fin (see FIG. 2B) about the platform 124.

As is further explained below, the platform 124 is a liquid permeable structure, such as a screen or plate with holes, that is structured and arranged to support wooden materials, which are used in the rapid aging process accomplished by RAS 100. Indeed, as is further set forth below, the platform 124 ensures that wooden materials remain in the upper portion 110 of the vessel 102 and are easily agitated to be cycled through a target area 122 such that they are in a desired location to receive RF energy 118.

For the conceptual embodiment as shown herein, there is one aperture 104 and therefore one target area 122, however it will be understood and appreciated alternative embodiments may well provide multiple apertures 104 each with a corresponding target area 122. As may also be appreciated in FIG. 1, and further described below, the circulation system 106 returns at least a portion of the circulated liquid directly into the target area 122. As such, RAS 100 advantageously continually refreshes the wood materials within the target area 122, and ensures that they remain substantially saturated with liquid during the application of RF energy 118.

In addition, for at least one embodiment RAS 100 further includes at least one oxygenator 132, the oxygenator 132 structured and arranged to dispose oxygen within a liquid disposed within the vessel 102 and outgas congeners. The vessel 102 also includes at least one vent 134 for the release of gas from within the vessel 102.

For at least one embodiment, the vessel 102 is formed of stainless steel. Similarly, for at least one embodiment the platform 124 is formed of stainless steel. Further still, for at least one embodiment the vessel 102 and platform 124 are formed of food grade stainless steel. The vessel may also be equipped with one or more liquid valve ports (not shown) such that liquid may be disposed within the vessel 102 without the use of the access hatch. In addition, additional access hatches (not shown) may be provided proximate to the lower portion 108 or even in the bottom of the vessel 102 so as to facilitate cleaning, maintenance or other tasks.

For at least one embodiment, the RAS 100 further includes at least one computer 136 that has been structured and arranged to control the RF generator 116, the circulation system 106, the oxygenator 132, the external motor 130, and optionally the drain 114. In addition, the at least one computer 136 may further have communication with one or more sensors 138, affixed to or disposed within the vessel. In varying embodiments, these one or more sensors 138 may be structured and arranged to sense various factors, such as temperature at one or more locations within the vessel 102, fluid level, opacity of the fluid, rate of liquid circulatory flow, the nature of gasses within the vessel 102, and such other data points as may be desired in varying embodiments of RAS 100.

In varying embodiments, the at least one computer 136 may indeed be a single integrated computing system structured and arranged for the control and operation of RAS 100. For yet other embodiments, the control and operation of RAS 100 may be subdivided to different physical computer systems 136, which are operated in consort for the control and operation of RAS 100. For either situation, the one or more computer systems may be either off the shelf computing systems or custom-built systems that are further adapted by hardware or software 140 as provided by physical media 142 for the control and operation of RAS 100.

It will be understood and appreciated that the one or more computers 136 have wired (network cables or other direct wire(s)) or wireless (Wi-Fi, Bluetooth, Cellular, etc.) communication links 144 with one or more elements of RAS 100, and whether wired or wireless, such communication channels may be intermittent or constant without departing from the scope of the present invention. Further still, RAS 100, and more specifically the one or more computers 136 may also be controlled by a remote application, and or utilize cloud computing resources understood and appreciated to be provided by yet other remote systems and/or operators.

As will be understood in greater detail with respect to the following narrative description and accompanying illustrations, RAS 100 is structured and arranged to permit the rapid aging of a distilled spirit, such as distilled ethyl alcohol. It will be understood and appreciated, that such rapid aging is based in part upon the forced and accelerated interaction between wood and the distilled ethyl alcohol.

Moreover, distillation of a spirit is understood and appreciated to be the process and/or method of taking a fermented ethanol—such as may be derived from the fermentation of grain(s), grape(s), or berry(s), fruits, plants etc. . . . . The resulting fermented aqueous mixture is then heated to separate the ethanol from the water as the ethanol has a lower evaporation point and therefore may be easily separated from the water to provide a highly concentrated alcoholic liquid, e.g., the ethyl alcohol. Often there are other specific elements such as aldehydes, esters and fatty acids that are also present with the resulting ethyl alcohol solution, all of which have specific flavors and aromas, the unique combinations of these chemicals making each type of eventual spirit different from one another.

As noted above, in this initial state, most such distilled ethyl alcohol liquids are not typically consumed as a desirable flavor, nose, and color profiles have not yet been established and matured. These desirable flavor, nose, and color profiles are traditionally provided by wood of various types in which the distilled ethyl alcohol is aged for a period typically measured in months and years, if not decades to permit a natural interaction between the distilled alcohol and wood material.

To achieve this rapid aging, RAS 100 is provided with one or more units of wood 146 and distilled ethyl alcohol 150, which at the start of the rapid aging process is appreciated to be substantially transparent. Also referred to as a "white whisky" this is a raw product which is in essence simply the recaptured distillate that would traditionally be placed within a wooden barrel for traditional aging—more simply, it is an unprocessed distilled ethyl alcohol. For purposes of discussion and illustration, the initially substantially transparent nature of the distilled ethyl alcohol 150 is conceptually illustrated by dotted circles 152. The distilled ethyl alcohol 150 has a first proof of alcohol. Alcohol proof is understood and appreciated to be the measure of ethanol (alcohol) content in an alcoholic beverage, and is generally understood and appreciated to be 1.821 times the percentage of alcohol by volume. For at least one embodiment the first proof of the distilled ethyl alcohol 150 is about one hundred twenty-five proof (125 proof).

It will be further understood and appreciated that for at least one embodiment, the one or more units of wood 146, are provided as wood chips 148. Further, the wood chips 148 are provided by toasting wood chunks, such as wood staves, in an oven and then chipping the toasted wood into chips.

For at least one embodiment, the use of small wood chips 148 is desired so as to permit rapid saturation of the wood by the distilled ethyl alcohol 150. For at least one embodiment the chips are about ½" (0.5 inch) in size.

It will be understood and appreciated, that as shown in the enlarged oval 154 as taken from enlarged wood chip 156, wood, like most green plants, is a cellular structure presenting a plurality of cells or capillaries 158 which are typically established by cellulose and hemicellulose, two common polysaccharides that serve as the structural components of plant cell walls. As polysaccharides, cellulose and hemicellulose are appreciated to comprise a number of sugar molecules.

It will also be understood and appreciated that the wood presents various concentrations of cellulose, resins, tannins, and other materials. The chemical composition of such materials—cellulose, hemicellulose, resins, tannins, etc. . . . may contain similar molecules in different proportions.

For purposes of the present invention, and the following description, the nature of these materials—e.g., the cellulose, hemicellulose, resins, tannins, etc. . . . may be simplified, such that the capillaries 158 cellulose, hemicellulose, resins, tannins, etc. . . . of the wood chips 148 are appreciated to provide wood sugars 160 (conceptually shown as hexagons) and resins 162 (conceptually shown as stars), and other materials such as, but not limited to gums or tannins, shown as dots 164.

It will of course be understood and appreciated that actual wood 146/148 may provide many more desirable elements, and that there may also be variations of different elements, such as different wood sugars within any given type of wood. However, for purposes of discussion and ease of illustration, those skilled in the art will appreciate the general classification/categorization of three elements—wood sugars 160, resins 162, and other materials 164—is sufficient to encompass desirable elements and illustrate the teachings of the present invention without limitation to specifically just these three elements. For ease of illustration and discussion, these wood sugars 160, resins 162 and other materials 164 have been illustrated as separate elements distinct from the capillaries 158 themselves.

It is further appreciated that the types of wood sugars 160, resins 162 and other materials 164 vary by wood species—white oak, aka American oak, French Oak, Ash, Cherry, Maple, Walnut, etc. . . . . . Even within a given type of wood, the nature of the grain—course, medium, fine, superfine—present different options for the nature of the capillaries 158 and thus the concentrations of wood sugars 160, resins 162 and other materials 164 vary as well. And further, end grain and surface grain present different orientations of the capillaries 158, and as such permit different access to the wood sugars 160, resins 162 and other materials 164.

Indeed, within the distilled beverage industry it is generally accepted that end grain wood provides more tart/bitter tasting notes, while surface grain provides smooth/flavorful notes. Moreover, the orientation of the grain in traditional barrel aging is known to provide different resulting flavor characteristics. Of course, as barrels are made from strips of wood, it is generally more costly to establish strips of wood with the grain running perpendicular to the longitudinal center of the barrel—but such may be provided in the interest of specific flavor profiles.

Chipping the at least one unit of wood 146 provides an appreciable mix of surface grain and end grain that may not be easily obtainable with traditional barrel aging. Indeed, alterations to the process of chipping may permit the wood chips 148 to be provided with more surface grain relative to end grain, more end grain relative to surface grain, or about an even approximation of surface grain to end grain. Such fungibility in how the wood chips may be provided advantageously provides a wide spectrum for the eventual characteristics of the rapidly aged distilled ethyl alcohol 150 provided by RAS 100.

It is the forced and accelerated interaction of the distilled ethyl alcohol 150 with the wood chips 148, and more specifically these wood sugars 160, resins 162 and other materials 164, achieved through the constant application of RF energy at a preselected frequency which advantageously permits RAS 100 to rapidly age the distilled ethyl alcohol 150 in a matter of hours to the equivalent of many years of traditional barrel aging. Indeed, for at least one embodiment, RAS 100 rapid ages the distilled ethyl alcohol 150 in about twenty-four (24) hours to the equivalent of about ten (10) years of traditional barrel aging.

To appreciate this advantageous achievement, it is helpful to review that conventional thermal treatment in food processing relies on the transfer of heat by conduction and/or convection. For both of these, heat energy is physically transferred from one element to the next, and as such it will be understood and appreciated that to heat the center or any given area of a medium, the conduction or convention heat energy must travel through other portions of the medium before reaching the desired area. In other words, heat is applied to the an outside, passed to inner material and to yet further inner material in essentially a mechanical process. Absent the specific placement of a heating element within the medium, it is not possible to heat a specific area without that heat energy having propagated through—and thereby heating—other portions of the medium first.

As an alternative, radiation is emission of energy from a source and can exist across a spectrum from very low-energy (low frequency), such as power lines, to very high-energy (high frequency), such as X-rays and gamma rays. Radio frequency energy, commonly referred to as RF energy, includes radio waves and micro waves and is found at the lower-energy end of the electromagnet spectrum, below visible light. When absorbed in large amounts by materials, RF energy can produce heat.

The use of RF energy to generate heat is a fairly common practice, but when heat is the intention, the application of RF energy is set at a level of intensity that will not result in the destruction of the material. However, as is the case with the present invention, the resulting heat may indeed be a natural byproduct of a more desired outcome resulting from the application of RF energy—the intentional fracturing and expansion of the capillaries 158 of the distilled ethyl alcohol 150 saturated wood chips 148.

RF energy is a form of electromagnetic radiation. In sharp contrast to mechanical energy—which requires a medium through which to travel (the molecules of the medium bump into one another passing the energy from one element to the next), and cannot travel through a vacuum, RF energy does not require a medium and therefore can travel through a vacuum as well as through a first medium without causing appreciable effect or disturbance to subsequently impinge upon and second medium or material upon and within which it can and does cause a significant effect and/or disturbance.

In vastly simplified terms, all matter is comprised of atoms with electrons, and how these atoms are arranged with one another defines the nature of the material and is why one material is different from another. In these various arrangement configurations, the electrons are appreciated to be at different, but specific energy levels.

As RF energy attempts to transverse through a material, the ability to do so is determined by whether the frequency of the RF energy interacts with the electrons at their specific energy levels. Solid materials absorb the energy, while transparent materials do not. It will also be understood and appreciated that a material may be "solid" with respect to one frequency of RF energy, while "transparent" to another.

Further, when a material appears solid to an RF frequency, increasing the RF energy frequency intensifies the interaction of the RF energy upon the skin or surface of the material, commonly referred to as surface effect or skinning effect. In contrast, decreasing the RF energy frequency can and will permit the applied RF energy to react with the surface and underlying substance of the material. Indeed, careful selection of a predetermined frequency of RF energy permits substantially uniform absorption of the RF energy throughout a given unit of material.

Again, in vastly simplified terms, RF energy heating is the result of the absorbed RF energy agitating the molecules of an RF energy absorbing material to create friction between the molecules. More specifically, RF energy is composed of perpendicular oscillating electric and magnetic fields, i.e., electromagnetic fields. Molecules may be viewed as tiny electrical systems and as such, any given material has an electric dipole due to the distribution of the positive and negative charge of the various atoms bonded together to provide the molecule. An electric dipole may be influenced to align in one direction or another based on the presence and orientation of a corresponding electromagnetic fields.

For a material that is "solid" to a specific RF frequency, when a sufficient amount of the RF energy is applied such that the oscillating electromagnetic fields of RF energy induce oscillation of the molecules comprising the material by aligning the dipole fields of the molecules, the resulting friction between the oscillating molecules results in heat.

Those skilled in the art of RF energy and its various uses and applications will understand and appreciate that RF energy interacts with surfaces more than intermediate material. RF energy causes oscillation of polar molecules, but the polar molecules of surfaces and at surfaces take precedence over materials without surfaces. A simple example of water in a traditional household microwave oven may serve to help illustrate this principle. When a glass of water is placed within a microwave, the heating of the water occurs at the surface of the water and along the surface of the glass where the water and the glass are in contact with each other, but as a household microwave oven operates with pulses, and as discussed further below, the on/off pulsation allows the generated heat energy to be dispersed throughout the water, though careful measurement would indicate that the water was initially hotter at the surface and along the border of contact with the glass than in the middle of the water—removed from the surface and boundary of the glass container.

By placing solid material into the water, additional points of surface contact are thus created permitting greater interaction by the RF energy with these additional surfaces, and thus more rapid heating of the water in the glass.

Moreover, by selecting different frequencies, RF energy can be directed to impinge upon just a surface causing localized surface heating, or to penetrate the surface so as to cause a more uniform heating throughout the material. In addition, the frequency of the RF energy can be selected to pass through substantially transparent materials—air, gas, glass, transparent liquid such as distilled ethyl alcohol 150, etc. . . . —while being absorbed by non-transparent, i.e., solid—as in opaque, materials, such as wood chips 148. In other words, RF energy interacts with opaque materials because to the RF energy, the opacity is essentially a surface upon which the RF energy skinning effect may develop.

When RF energy is applied in pulses, generally each pulse is absorbed and partially dissipates within the material before the next pulse is applied. Pulse RF energy application is therefore often appropriate where even dissipation of the applied energy is desired throughout a large volume of material and/or localized areas of high temperature are not desired and/or may be detrimental to an overall environment requiring uniform temperature or at least temperatures that do not exceed thresholds that would degrade portions of the environment.

Conversely, constant application of RF energy is far more appropriate when and where intense localized heating is fundamentally necessary and dissipation of the applied RF energy throughout the environment is detrimental to the intended purpose of localized heating. Of course, rapid pulsing may in some embodiments be nearly as efficient as constant energy, and/or may be desired for one or more reasons.

With respect to the present invention, RAS 100, and more specifically the RF generator 116, is structured and arranged to provide constant RF energy 118 at a preselected frequency, selected to pass through substantially transparent material, such as the distilled ethyl alcohol 150 in its initial substantially transparent form, while being absorbed by solid/opaque material, such as the wood chips 148. As discussed above, it is the surface of the wood chips 148 that the applied constant RF energy is incident upon, however, as the wood chips 148 are saturated in the distilled ethyl alcohol 150, to avoid issues of confusion with discussing "surfaces," the combined wood chips 148 distilled ethyl alcohol 150 are referred to as an opaque mixture, with the understanding and appreciation that the wood chips 148 as the opaque elements upon which absorb the RF energy (the surface skinning effect). This absorbed RF energy results in the rapid polar oscillation for the fracture and expansion of the capillaries 158.

Although this oscillation could be induced for the mere purpose of heating, with respect to the present invention, this oscillation is induced for the specific purpose of causing fracture/expansion/rupture/breakdown/degradation/decomposition of the wood chips 148, and more specifically the capillaries 158 therein, thus permitting the release and absorption of at least the wood sugars 160, and potentially resins 162 and other materials 164 by the distilled ethyl alcohol 150.

While heating is a result of this polar molecule oscillation as well, and in many other applications heating may well be the intended outcome of the application of RF energy, with respect to the present invention and RAS 100, heating is a byproduct of the desired fracturing and expansion of the capillaries 158.

To restate, it will be understood and appreciated that RF energy is generally applied in one of two forms—pulsed application and continuous application. Those skilled in the art will understand and appreciate that constant RF energy as a narrowband focused beam results in a skinning effect, where the surface of the targeted material is more rapidly affected than the center (the oscillation and resulting heating occurs at and proximate to the surface, rather than the center). In contrast, pulsed RF does not result in a skinning effect—the on/off cycle permitting dissipation and making it unsuitable for applications desiring a skinning effect, but very suitable for uniform heating.

With respect to the present application, as uniform heating is not the desired intention, RAS 100 employs constant RF energy so as to intentionally achieve a skinning effect upon the opaque materials, e.g., the saturated wood chips 148. In addition, as a narrowband focused beam, the constant RF energy is easily applied to a target area 122 which is essentially directly below the aperture 104, or at the very least generally in line with the emitted constant RF energy 118 as it exists from the aperture 104.

Indeed, because of the advantageous nature of the constant RF energy to pass through the transparent material, e.g., the distilled ethyl alcohol 150, the amount of energy imparted upon the wood chips 148 is substantially greater than can be achieved by traditional heating methods, such as convection, conduction, vibration or other mechanical methodologies wherein the transfer of heat energy to the wood chips 148 would by necessity also induce interaction (and heating) of the distilled ethyl alcohol 150.

In other words, if the fracturing and expansion of the capillaries 158 of the wood chips 148 for the release of the wood sugars 160 is viewed in the overly simplified light of a result of "heating" the wood chips 148, absent the use of constant RF energy, such heating would by necessity be the result of heating the entire mixture. Such an effort to raise the entire mixture to such a high temperature will have the detrimental effect of breaking down the distilled ethyl alcohol 150. More simply, if the entire mixture was heated to the resulting temperatures produced by the advantageous skinning effect of the constant RF energy, breakdown of the wood chips 148, and most specifically the capillaries 158, might occur but it would be pointless accomplishment as the distilled ethyl alcohol 150 would be destroyed. If the wood chips 148 were fractured and expanded without the presence of a liquid, it is most likely that the wood would combust—and thus destroy the wood sugars 160, resins 162 and other materials 164.

The present invention of RAS 100 advantageously overcomes this problem as constant RF energy 118 is advantageously applied in a target area 122 to opaque materials (the wood chips 148) to induce traumatic heating (fracturing and expansion) without such traumatic heating occurring to the surrounding wood chips 148 and distilled ethyl alcohol 150. In addition, because the extreme heating/traumatic heating is so localized, the remaining balance of wood chips 148 and distilled ethyl alcohol 150 provide thermal regulation, and cooling to the overall opaque mixture which ensures that the distilled ethyl alcohol 150 is not destroyed.

To summarize, RAS 100 advantageously utilizes constant RF energy to apply concentrated energy directly to the saturated wood chips 148 so as to fracture and expand the capillaries 158 for release of, and access to, the wood sugars 160 by the distilled ethyl alcohol 150 so as to dissolve and absorb the wood sugars 160. While some heating and interaction between the constant RF energy and the polar molecules of water and the distilled ethyl alcohol 150 may occur in addition to the intended interaction with the polar molecules of the opaque material (e.g. the saturated wood chips 148), such interactions are understood and appreciated to be statistically insignificant and may therefore be considered as inconsequential with respect to the advantageous teaching of using constant RF energy for the fracturing and expansion of the capillaries 158 of the wood chips 148 for the release of wood sugars 160.

Those skilled in the art of RF energy application may simplify things and speak in terms of applying constant RF energy to heat the saturated wood chips 148 to expand and fracture, but this "heating" is also appreciated to be fundamentally different from conduction or convection heating methods, as this heating due to molecular oscillation exceeds what would be necessary to simply heat the wood chips 148, but rather exceeds simply heating and transcends to degradation of the wood chips 148. Indeed, those skilled in the art of RF energy application will fundamentally understand and appreciate that alternative application of convection or conduction heating methods cannot and will not achieve the advantageous result of the present invention. Moreover, absent a skilled in the art appreciation for RF energy application, a view of the present invention as simply teaching heating of wood chips 148 to degrade them for the release of wood sugars 160, resins 162, and other materials 163 is an improper simplification that belies the true advantageous nature of the present invention.

Moreover, for at least one embodiment, the predetermined frequency of constant RF energy 118 is selected to pass through the distilled ethyl alcohol 150 for application to the at least one unit of wood 146. Stated differently, for at least one embodiment the predetermined frequency of constant RF energy is selected in a range to impinge upon opaque material within the vessel 102 more than dipoles of the alcohol or water. More specifically, for at least one embodiment, the predetermined frequency of constant RF energy 118 provided by the RF generator 116 is in the range from about 3 MHz to about 915 MHz. Further still, for at least one embodiment the RF generator 116 is further configured as a magnetron operating at about 915 MHz at, for example, about 10-200 kW, which may be tuned to provide the desired skinning effect upon the wood chips 148 within the target area 122.

Similar to high frequency RF which seeks to travel along surfaces, high voltage also travels around the outside of most things—the cage effect—which is the path of least resistance. As a result, the high RF frequency of the RF generator 116—about 915 MHz for at least one embodiment, combined with the high voltage—about 100,000 watts (100 kW) for at least one embodiment, provided as constant RF energy 118, ensures the development of both a skinning effect and a cage effect upon the surfaces of the solid/opaque wood chips 148 within the target area 122, that results in traumatic localized heating due to excessive polar oscillation that results in the desired fracturing and expansion of the wood chips 148.

It may thus be appreciated that the constant RF energy as generated and applied by RAS 100 is not traditional microwave energy. The generated constant RF energy 118 as utilized by RAS 100 is both at a lower frequency (megahertz rather than gigahertz) and is not intended to specifically interact with the diploes of water or alcohol molecules.

For embodiments incorporating at least one computer 136 as noted above, the predetermined frequency of constant RF energy 118 may be adjusted during the rapid aging process as advantageously permitted by RAS 100.

As heat is a natural byproduct of the constant RF energy 118 as applied to the opaque material, e.g., the saturated wood chips 148, and as noted above in the brief discussion of distillation alcohol has a low evaporation point, it is most probable that the rapid aging process achieved by RAS 100 may result in evaporative liquid vapors. These vapors could be detrimental to the RF generator 116, and as with the loss of the "angles share" in traditional barrel aging represent a potential loss of eventual product. As such, at least one embodiment of RAS 100 incorporates a vapor recovery system 166. For at least one embodiment, the vapor recovery system 166 is a heat exchanger 168. This heat exchanger may be incorporated with or coupled to a portion of the waveguide 120 to capture, condense and return liquid back to the vessel.

The process for rapid aging of a distilled ethyl alcohol 150 may be more fully appreciated with respect to FIGS. 2-9, wherein an exemplary vessel 102 has been enlarged and shown in cut-through view for ease of illustration and discussion of at least one method for rapid aging of distilled ethyl alcohol 150 as advantageously permitted by an embodiment of RAS 100.

Figure 2A:
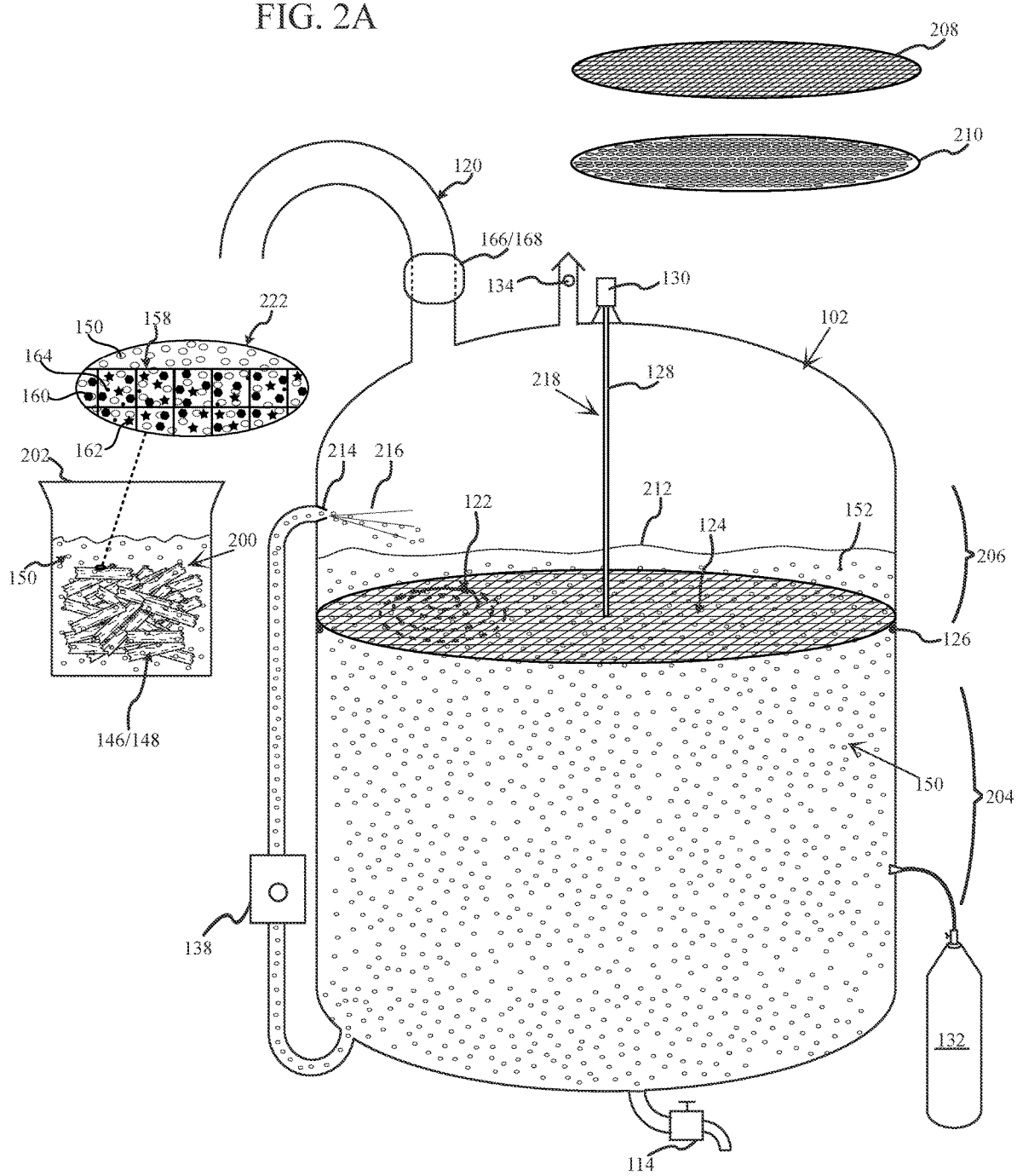
FIG. 2A illustrates a cut through view of the vessel shown in FIG. 1 of the rapid aging system and more specifically the vessel with a wood material supporting platform and a container with a mixture of units of wood and distilled ethyl alcohol as an opaque mixture in accordance with at least one embodiment of the present invention.
Figure 2B:
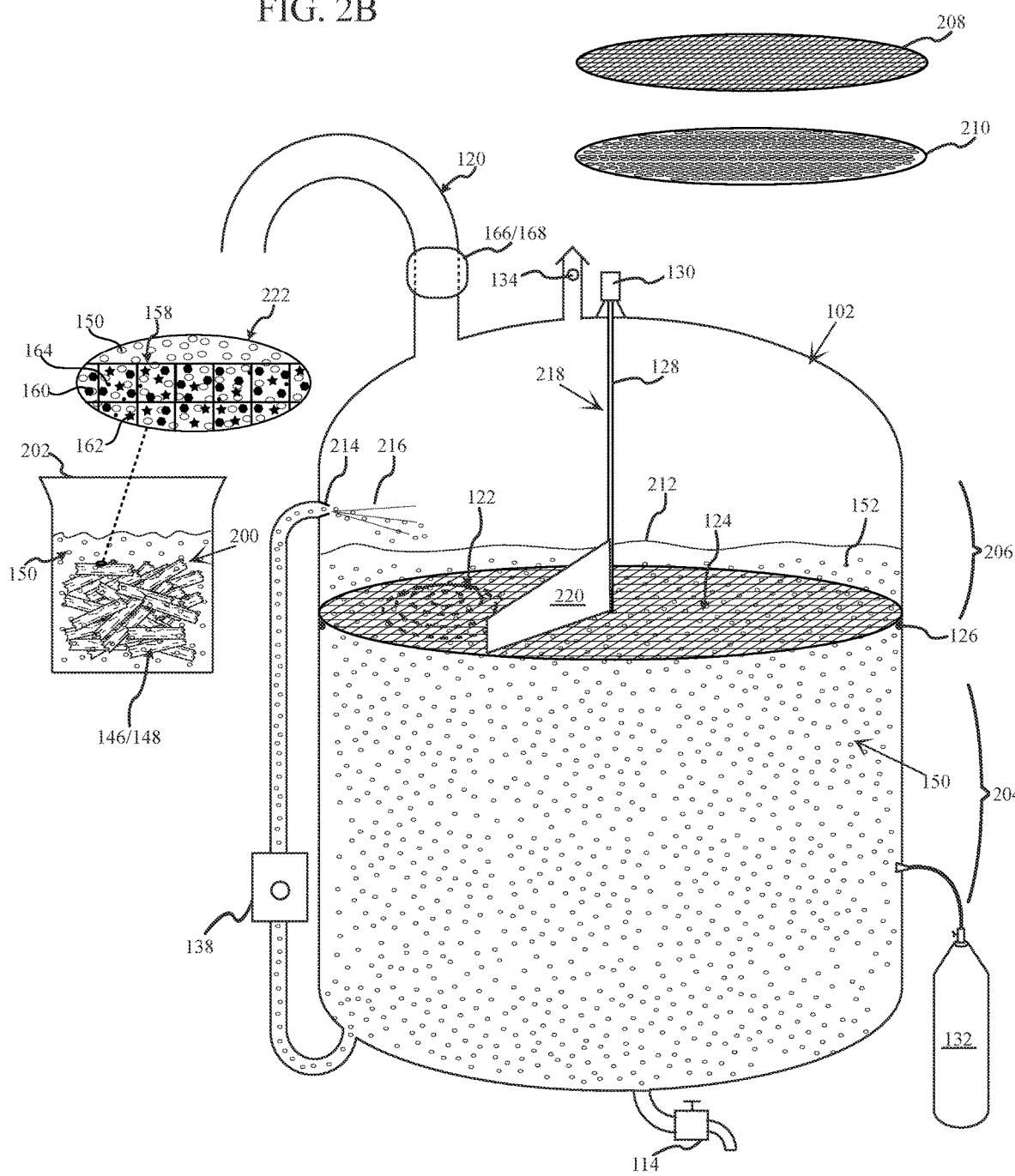
FIG. 2B illustrates a cut through view of the vessel shown in FIG. 1 of the rapid aging system and more specifically the vessel with a wood material supporting platform and at least one sweeper blade and a container with a mixture of units of wood and distilled ethyl alcohol as an opaque mixture in accordance with at least one embodiment of the present invention.

As shown in FIGS. 2A and 2B, at least one unit of wood 146, and more specifically wood chips 148 have been provided, as has a substantially transparent distilled ethyl alcohol 150, the initial transparency of the distilled ethyl alcohol 150 again conceptually illustrated by dotted circles 152.

Combined, the wood chips 148 and distilled ethyl alcohol 150 provide an opaque mixture 200, which for ease of illustration and discussion is initially shown in storage container 202 so that the nature of the platform 124 may be more easily described and visually perceived. Pre-establishing the opaque mixture 200 in a storage container 202 may also be desired in some embodiments so as to allow pre-soaking and saturation of the wood chips 148. Of course, the opaque mixture 200 may also be established within the vessel 102 by directly adding and/or mixing the wood chips 148 and distilled ethyl alcohol 150 directly within the vessel 102.

As shown, the platform 124 is structured and arranged to substantially fit within the vessel and essentially subdivide the internal space of the vessel 102 into two sections—a bottom portion 204 and a top portion 206. Simply put, the platform 124 is structured and arranged to support the plurality of wood chips 148 that are disposed in the vessel 102, in the top portion 206 of the vessel 102, and thus most proximate and available to the RF energy when applied from the aperture 104.

As the wood chips 148 are indeed part of the opaque mixture 200 disposed within the vessel, and which is comprised of the wood chips 148 and the distilled ethyl alcohol 150, it will be understood and appreciated that the platform is a liquid permeable structure. More specifically, for at least one embodiment the platform 124 is provided by a supported screen or mesh 208, e.g., exemplary platform 124A. In an alternative embodiment, the platform 124 is provided as a plate 210 with a plurality of holes, e.g., exemplary platform 124B. The platform may also be a combination of screen and solid areas with holes, and/or may even have an additional filter layer (not shown). For ease of illustration, the platform 124 as disposed within the vessel 102 has been conceptualized as comprising screen or mesh. As the applied RF energy will fracture and expand the wood chips 148 some small wood elements may pass through the platform 124.

For at least one embodiment, the platform 124 may be a floating platform, having one or more ballast chambers (not shown) sufficient to provide a positive buoyancy to the platform 124 even when loaded with an appropriate amount of wood chips as may be desired for a specific rapid aging event. For yet another embodiment, the platform 124 may rest upon one or more internal supports 126, such as an annular ring.

As noted above, RAS 100 advantageously utilizes constant RF energy to fracture and expand opaque material—the units of wood 146/wood chips 148 comprising at least a portion of the opaque mixture 200 that is within the target area 122. This fracturing and expanding may be viewed as the result of superheating or traumatic heating, and is understood and appreciated to be localized event substantially within and immediately adjacent to the target area 122. As also noted above, the state of the wood chips 148 as saturated and/or immersed in the distilled ethyl alcohol 150 advantageously permits this fracturing and expansion to occur without the wood chips 148 combusting.

It will therefore be understood and appreciated that an advantage of the platform 124 is to concentrate the wood chips 148 in the top portion 206 of the vessel 102 and to maintain the wood chips 148 at or just below the liquid surface 212 within the vessel 102.

As used and described herein, it will be understood and appreciated that the target area 122 is not a two-dimensional (2D) area proximate to the liquid surface 212 of the liquid or the platform 124. Rather it is a column of space which may be considered in a sense as a volume—the provided RF energy 118 will impinge upon opaque materials (e.g., the wood chips 148) within the target area 122, with some wood chips 148 being closer to the surface while others are closer to the platform 124. Some wood chips 148 may even breach the liquid surface 212 momentarily, or be caught up in a froth or foam that makes the actual location of the liquid surface 212 more difficult to quantify Regardless, the target area 122 is the radial area into which the narrow beam of constant RF energy is applied, and then absorbed by opaque materials at varying depth within that generalized area.

To further ensure that the wood chips 148 within the target area 122 are indeed at least saturated with liquid as they receive the applied RF energy, for at least one embodiment the liquid circulation system 106 has at least one spray nozzle 214 structured and arranged to spray at least a portion of the circulated liquid into/onto an area disposed below the at least one aperture 104, e.g., the target area 122.

For at least one embodiment, the spray nozzle 214, and resulting spray 216 of at least a portion of the circulated liquid affords at least two additional benefits. First, as the spray is traveling through air, there is a potential cooling effect that helps to manage the overall ambient temperature of the liquid mixture within the vessel 102 does reach a level detrimental to the distilled ethyl alcohol (so hot that it evaporates). Second, the localized heating achieved with the constant RF energy is traumatic to the wood chips 148 and as discussed below, can and does produce convection currents within at least the localized area of the heated opaque mixture 200. This can result in the development of froth within the vessel 102, and the resulting spray 216 advantageously serves to knock down resulting froth.

For at least one embodiment, the relative height of the platform 124 within the vessel 102 is adjustable so as to accommodate a greater or lesser volume of wood chips 148 for varying rapid aging treatments. For at least one embodiment, the relative height of the platform 124 may be adjusted by adjusting the location of the internal support 126, i.e., the annular ring—such as from one internal groove to another. For yet another embodiment, the relative height of the platform 124 within the vessel 102 is established by adjusting the length of the central shaft 128.

As may be appreciated from the figures, the target area 122 is but a fraction of the entire possible liquid surface 212. As such, to ensure rapid application of the RF energy to substantially all of the wood chips 148, for at least one embodiment RAS 100 includes a wood agitation system 218 that is structured and arranged to move the wood chips 148 below the aperture 104, and therefore through the target area 122. In other words, the wood agitation system 218 cycles the wood chips 148 through the target area 122.

For at least one embodiment, the wood agitation system 218 is provided at least in part by an external motor 130 being coupled to the central shaft 128 which is in turn coupled to the platform 124 such that the external motor 130 rotates the platform 124 about a central axis and thereby moves the wood chips 148 through the target area. For yet an alternative embodiment as shown in FIG. 2B, the wood agitation system 218 is provided at least in part by an external motor 130 being coupled to a central shaft 128 which is in turn coupled to at least one sweeper fin 220 which is driven to sweep about the platform 124 and circulate the wood chips 148 through the target area. With respect to FIGS. 2A, 2B, 3A, 3B, 5A, 5B, 6A, 6B, 7A, 7B, 8A, 8B, 9A, 9B, 10A and 10B the differentiation between each set (A vs B) is the presence or absence of the sweeper fin 220.

For still yet another embodiment, the wood agitation system 218 is provided at least in part by an external motor 130 being coupled to the central shaft 128 which in turn is mechanically coupled to rotate both the platform 124 and at least one sweeper fin 220. Further still, the at least one sweeper fin 220 may be "eggbeater'ish" such as it rotates about a longitudinal axis that is generally normal to the central shaft 128, thereby churning the wood chips 148 in addition to cycling them through the target area 122.

In varying embodiments, the rotation of the platform 124 and/or the sweeper fin 220 may be continuous, intermittent, or even variable as may be controlled by the computer 136.

For at least one embodiment, the platform is provided by stainless steel. While the platform may be provided by any number of materials, including ceramic, glass, polymer and composite materials, it will generally be understood and appreciated that the platform 124 is provided by a material that will not degrade or otherwise be adversely affected by the applied RF energy, or the resultant by-product heat, resulting from the localized application of the RF energy to the opaque material—the units of wood 146/wood chips 148 comprising at least a portion of the opaque mixture 200 within the target area 122.

Returning to the opaque mixture 200, as shown in the enlarged oval 222 presenting an enlarged portion of a wood chip 148, the capillaries 158 of the wood chip 148 are substantially intact, and present a plurality of wood sugars 160, resins 162, and other materials 164. It may also be appreciated that distilled ethyl alcohol 150, as indicated by the dotted circles 152 has saturated into the capillaries 158 of the wood chips 148.

Alcohol is a solvent to wood sugars and may also be a solvent to some wood resins. Accordingly, for at least one embodiment, the efficiency and effectiveness of the RAS 100 to rapidly age the distilled ethyl alcohol 150 is improved by permitting the wood chips 148 to become fully saturated before the application of constant RF energy.

For at least one embodiment, the opaque mixture 200 of distilled ethyl alcohol 150 and wood chips 148 may be created ahead of time and set aside in another container where it is left to saturate for a period of time before being disposed within the vessel 102. Alternatively, the opaque mixture 200 may be established within the vessel 102 and left to saturate before the application of constant RF energy is commenced. For at least one embodiment, the opaque mixture 200 is allowed to rest for about 24 hours to saturate the at least one unit of wood 146, aka the wood chips 148, prior to the application of the constant RF energy.

For the opaque mixture 200 as disposed within the vessel 102, for at least one embodiment, the ratio of the distilled ethyl alcohol 150 to the at least one unit of wood 146, aka wood chips 148, is between about 2.4 oz to about 4.1 oz of wood per gallon.

Figure 3A:
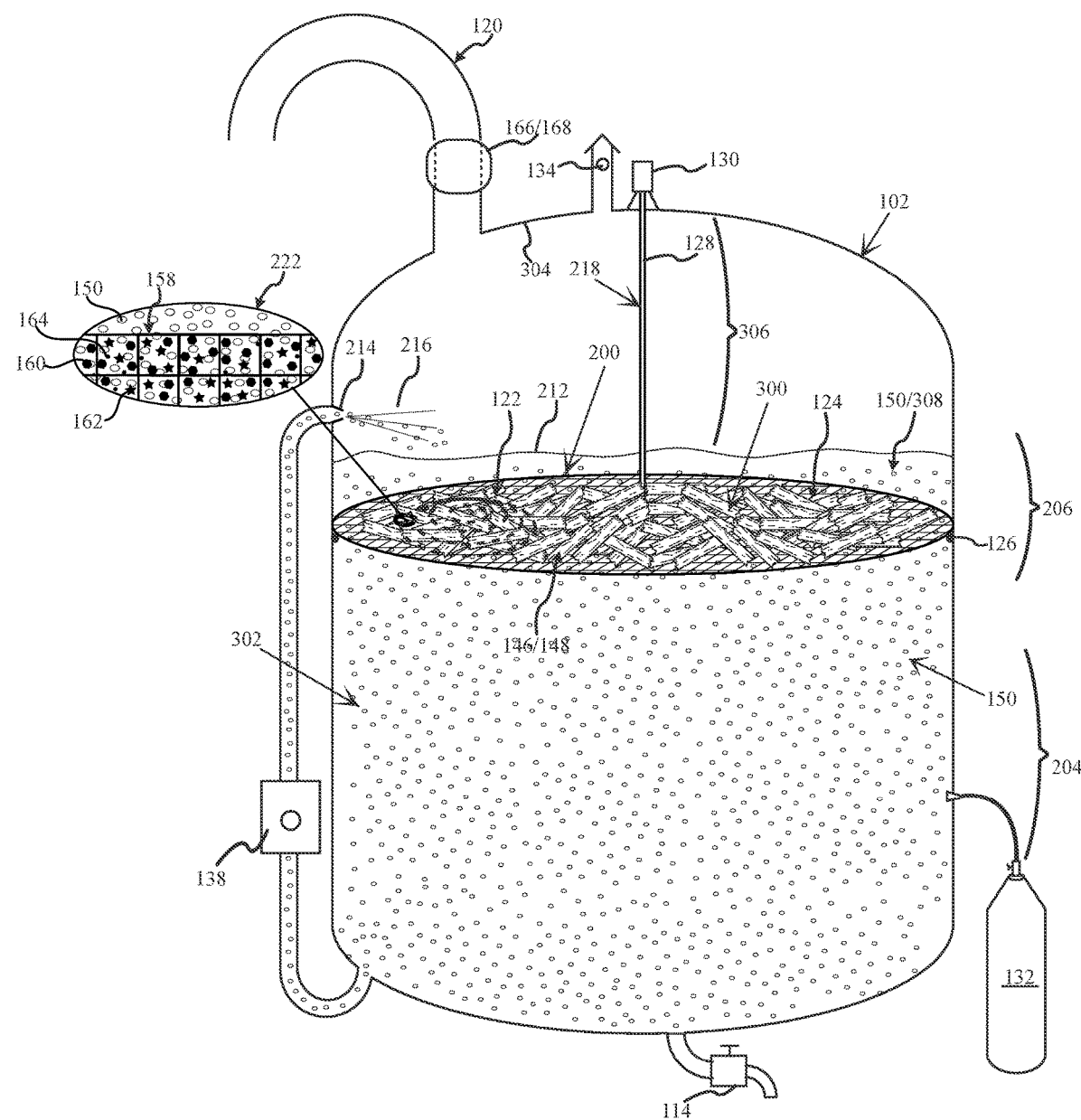
FIG. 3A illustrates a cut through view of the vessel shown in FIG. 1 of the rapid aging system and more specifically the vessel with a wood material supporting platform, with at least one unit of wood and distilled ethyl alcohol disposed therein as an opaque mixture in accordance with at least one embodiment of the present invention.
Figure 3B:
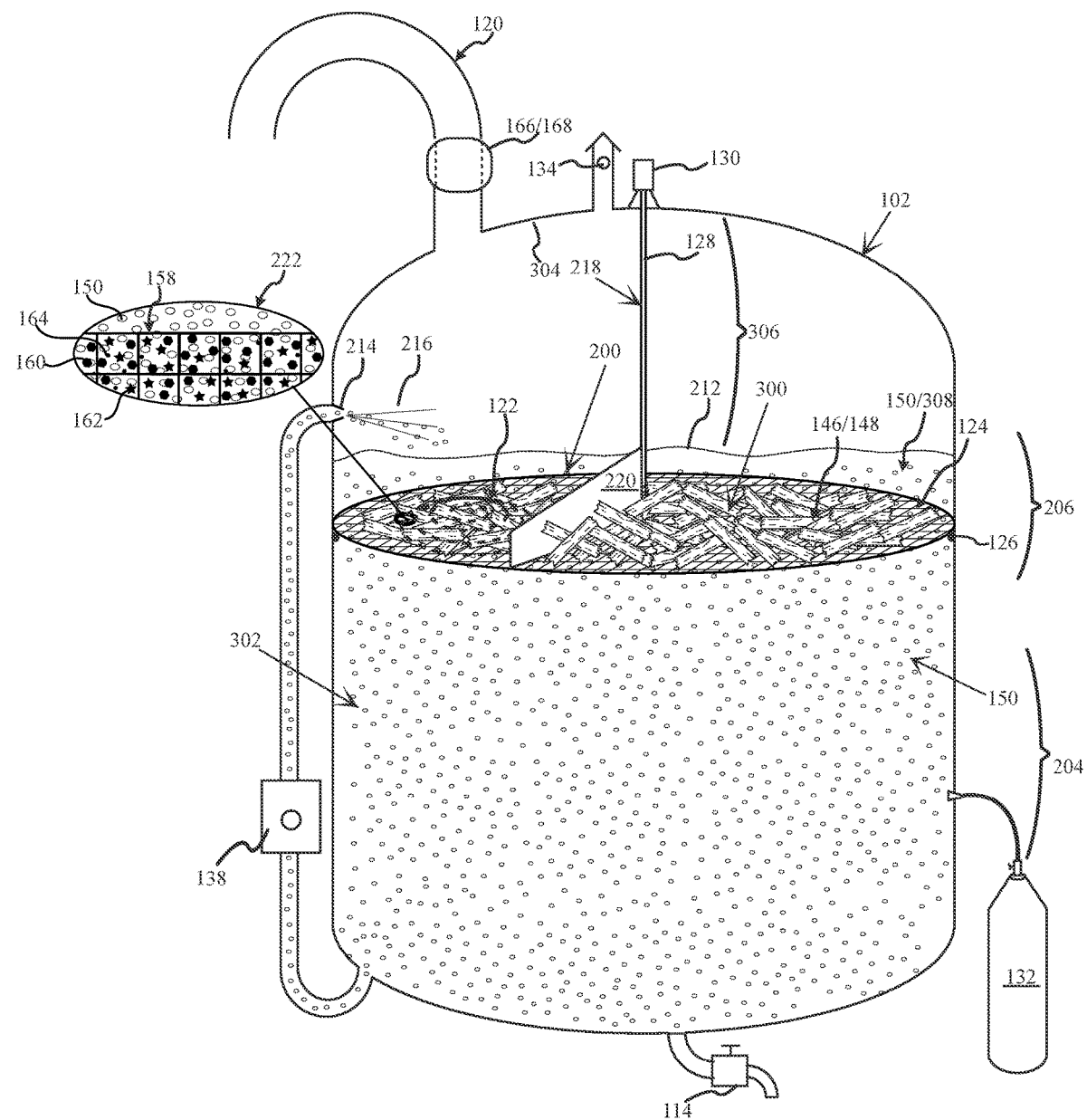
FIG. 3B illustrates a cut through view of the vessel shown in FIG. 1 of the rapid aging system and more specifically the vessel with a wood material supporting platform and at least one sweeper blade, with at least one unit of wood and distilled ethyl alcohol disposed therein as an opaque mixture in accordance with at least one embodiment of the present invention.

With the nature of the platform 124 now established, FIGS. 3A and 3B present conceptualizations of RAS 100 with the opaque mixture 200 now disposed within the vessel 102.

With respect to the opaque mixture 200, it will be appreciated that the opaque mixture 200 need not be uniformly opaque. Indeed, initially as the wood chips 148 saturated by the distilled ethyl alcohol 150 are supported by the platform 124, they are in the top portion 206 of the vessel. Moreover, it will be appreciated that the opaque portion 300 of the opaque mixture 200 is substantially coincident with the location of the wood chips 148. A substantially transparent portion 302 of the opaque mixture 200 is shown below the opaque portion 300.

With respect to the initial opaque portion 300, it will be understood and appreciated that initially, as the units of wood 146, aka wood chips 148 are clearly opaque and the distilled ethyl alcohol 150 is clear, the opaque portion 300 of the opaque mixture is itself not entirely uniformly opaque as generally clear distilled ethyl alcohol 150/308 is conceptually illustrated above the plurality of wood chips 148.

It may also be appreciated from FIGS. 3A and 3B that the opaque mixture 200 has a surface 212 that is disposed below the inner top 304 of the vessel. Moreover, for at least one embodiment there is an air gap 306 within the vessel between the liquid surface 212 and the inner top 304 of the vessel 102, and this air gap 306 is in fluid communication with the vent 134.

As shown, for at least one embodiment, the aperture 104 for RF energy is also disposed in the vessel 102 proximate to the inner top 304. Such placement of the aperture 104 configures the aperture 104 to thus be above the liquid surface 212 of the opaque mixture 200. Although this configuration may be desired in some embodiments, as it permits the process of circulation to refresh the quantity of opaque mixture 200 directly below the aperture 104, in varying embodiments the location of the aperture 104 for the introduction of RF energy to the opaque mixture 200 and the position of the platform 124 supporting the wood chips 148 as the initial primary element of the opaque mixture 200 may be vary without departing from the scope of the present invention.

Moreover, as the following description will explain, the RF energy is provided into/upon dense portions of the opaque mixture 200. Any placement of the aperture for RF energy delivery that achieves application of RF energy upon dense portions of the opaque mixture 200 is certainly in keeping with the teachings herein. For ease of illustration, discussion, and fabrication, for at least one embodiment the aperture 104 is shown disposed proximate to the top of the vessel 102 such that it is above the liquid surface 212 of the opaque mixture 200.

Figure 4A:
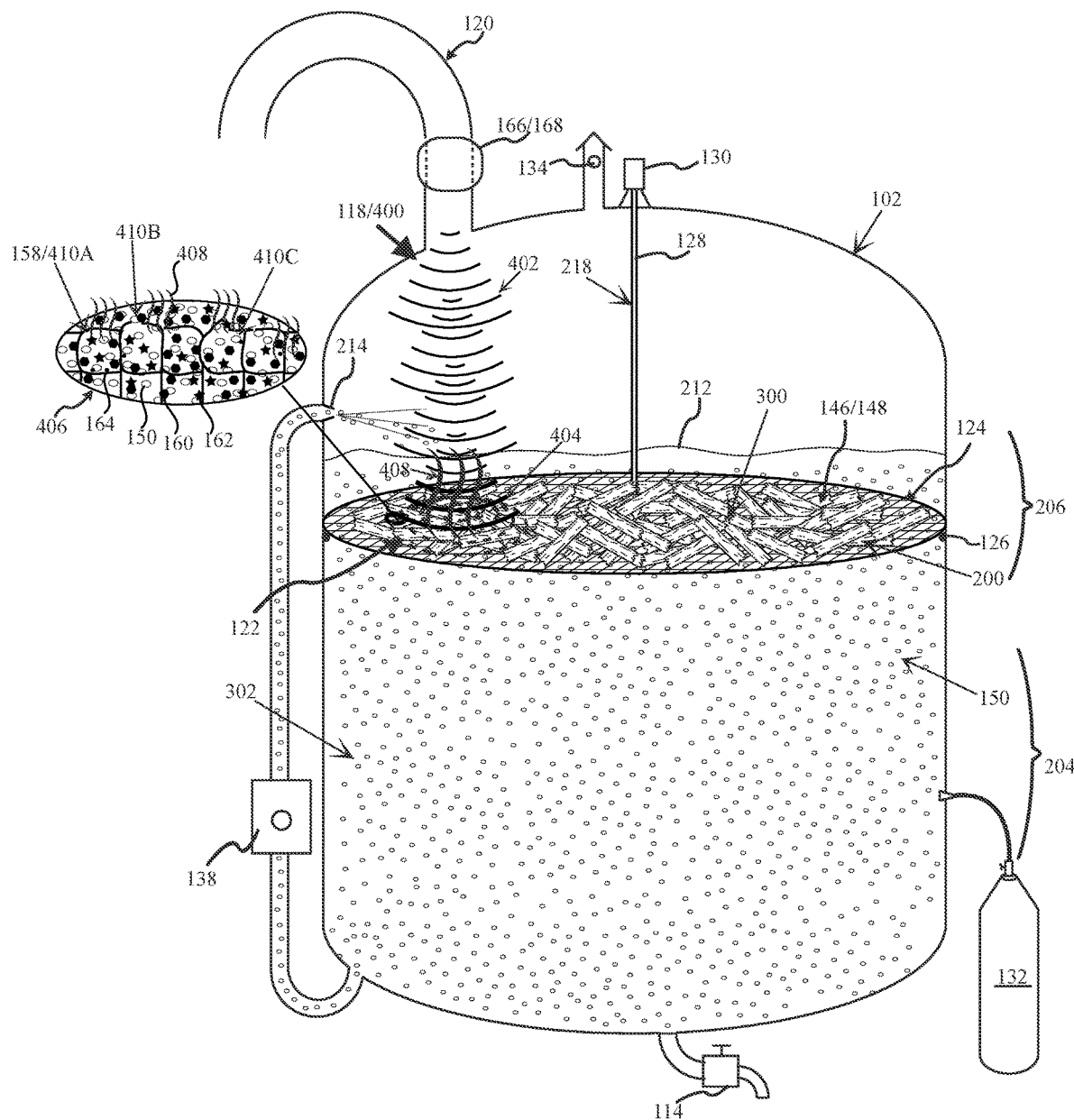
FIG. 4A illustrates a cut through view of the vessel shown in FIG. 1 of the rapid aging system and more specifically the vessel with a wood material supporting platform, with the initial application of RF energy upon the opaque mixture in accordance with at least one embodiment of the present invention.
Figure 4B:
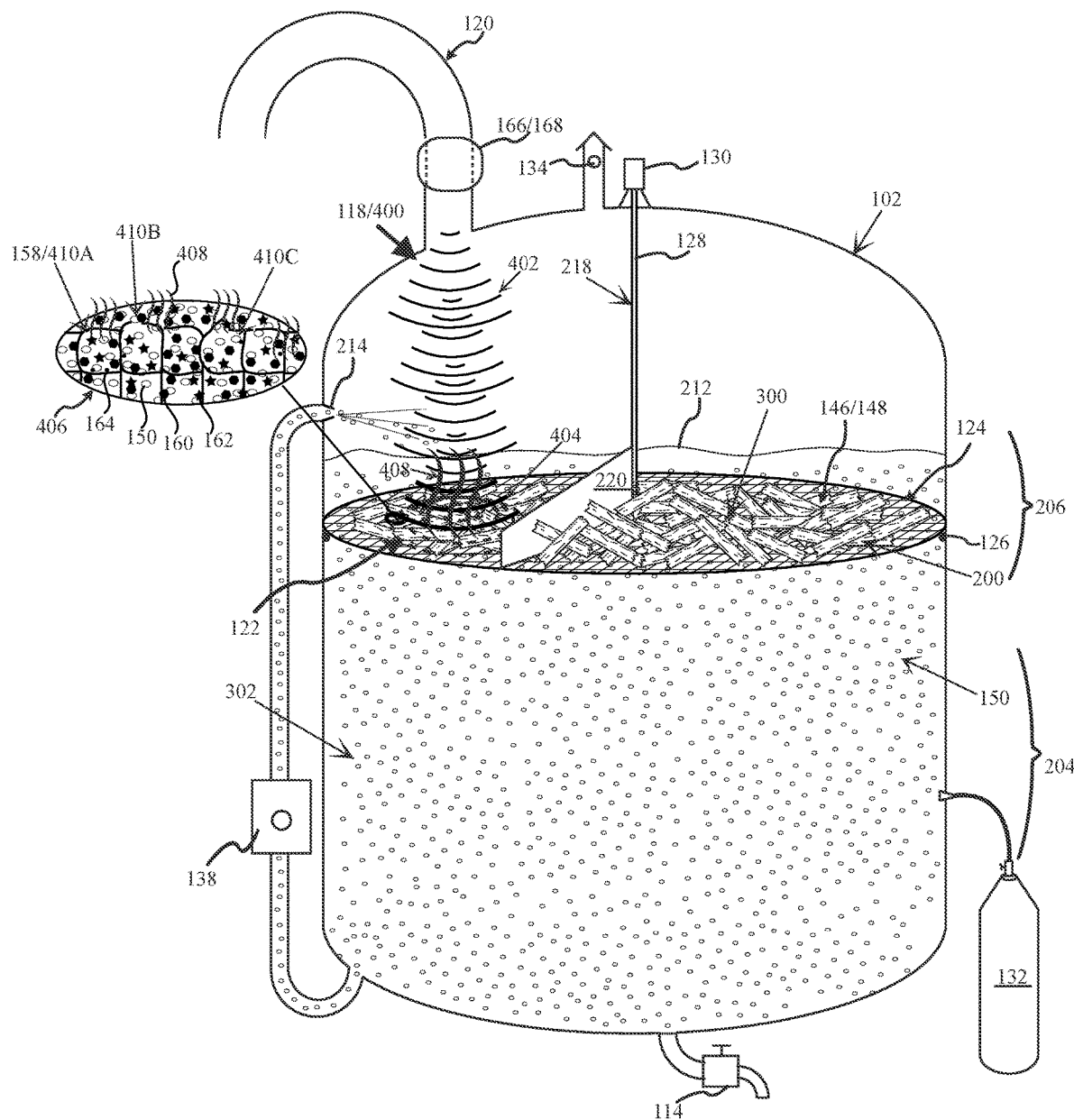
FIG. 4B illustrates a cut through view of the vessel shown in FIG. 1 of the rapid aging system and more specifically the vessel with a wood material supporting platform and at least one sweeper blade, with the initial application of RF energy upon the opaque mixture in accordance with at least one embodiment of the present invention.

In FIGS. 4A and 4B, the RF generator (see FIG. 1) has been engaged and constant RF energy 118/400 is being directed from the waveguide 120 through the aperture 104 and into the vessel 102. As is conceptually illustrated by thin lines 402 versus thick lines 404 used to illustrate the constant RF energy 118/400, the constant RF energy is passing through the generally clear distilled ethyl alcohol 150/308 of the opaque mixture 200 (the distilled ethyl alcohol 150) and is impacting the opaque portion 300 of the opaque mixture 200, specifically the wood chips 148.

Thought shown as operational in FIGS. 2A, 2B, 3A and 3B for ease of discussion, if the circulation system 106 has not already been engaged for mixing and circulation of the opaque mixture 200, for at least one embodiment the circulation system 106 is now engaged so as to advantageously assist with managing the localized intensity of heating that is the by-product of the fracturing and enlarging due to the application of the constant RF energy 118/400 upon the opaque materials, e.g., the wood chips 148.

As may be appreciated from the brief overview above, the constant RF energy 400 impinging upon the opaque mixture 200, and most specifically the wood chips 148, is applied with a frequency and intensity sufficient for the to induce such extreme oscillation of the molecules comprising the wood chips 148, and more specifically the capillaries 158, to fracture and expand. This extreme oscillation also results in the generation of heat within the wood chips 148. Moreover, the constant RF energy 400 generates a region of extremely high temperature proximate to the opaque elements of the opaque mixture. It will also be understood and appreciated that this extremely high temperature is localized to the portions of wood chips 148 that are within the target area and subject to the constant RF energy 400. In other words, this localized high temperature exceeds the ambient temperature of the rest of the opaque mixture throughout the vessel 102 (e.g., the opaque mixture of wood chips 148 and distilled ethyl alcohol 150 that is not currently being subjected to the constant RF energy 400 within the target area 122. For the exemplary early stage of the rapid aging process as shown in FIG. 3, it may be understood and appreciated that at this point in the process the opaque elements are substantially the wood chips 148.

This localized heat does dissipate throughout the opaque mixture 200 resulting in an overall rise in the ambient temperature of the overall opaque mixture 200 as a whole. For at least one embodiment, the ambient temperature of the overall opaque mixture 200, is greater than about sixty degrees Celsius (60° C.). For at least one embodiment, the ambient temperature of the overall opaque mixture 200 is about sixty-five point five degrees Celsius (65.5° C.).

As may be appreciated from enlarged oval 406 presenting an enlarged portion of a wood chip 148, the constant RF energy as applied to the wood chip 148 is resulting in the generation of heat 408 (shown as wavy lines) within the wood chip 148. In addition to the oscillation achieving intentional fracturing of the capillaries 158, the byproduct of the resulting heat 408 also induces expansion of the wood chip 148, and more specifically expansion and distortion of the capillaries 158/410. As has been conceptually shown, capillary 410A is distorted and capillaries 410B and 410C have ruptured.

This expansion and distortion of the capillaries 158/410 permits the capillaries 158/410 to more readily absorb the alcohol of the distilled ethyl alcohol 150. And, as alcohol is a solvent to sugars, the absorbed alcohol loosens and dissolves at least the wood sugars 160 into the distilled ethyl alcohol 150. The expanded condition of the capillaries 158/410 also permits the distilled ethyl alcohol 150 with loosened and/or dissolved wood sugars 160, resins 162 and other materials 164 to flow away from the at least one unit of wood 146/wood chip 148.

FIG. 5 presents a cut through top view of the vessel 102 so as to further appreciate the nature of the platform 124 as disposed within the vessel 102, and the units of wood 146, aka wood chips 148 disposed thereon. Viewed from above, the target area 122 of impinging constant RF energy 400 may also be further appreciated as a distinct portion of the overall potential area/volume of the opaque mixture 200 within the vessel 102.

As noted above, RAS 100 includes a wood agitation system 218 that is structured and arranged to move the wood chips 148 below the aperture 104, and therefore through the target area 122. In addition to the rotation of the platform 124 and/or sweeper fin 220 as discussed above, for at least one embodiment the wood agitation system 218 also includes a plurality of angled nozzles 500 as part of the at least one circulation system 106. These angled nozzles 500 are disposed proximate to the platform 124 at an angle to induce rotational flow (indicated by arrows 502) to the circulated liquid. As the wood chips 148 are disposed within the distilled ethyl alcohol 150 the rotation of the liquid mixture as a whole also imparts movement, mixing and agitation between and among the various wood chip 148.

In FIG. 5, the localized effect of the intense heating 408 may also be appreciated. FIG. 5 includes enlarged oval 406 depicting the generation of heat 408 and the enlarging and fracturing of capillaries 410A, 410B, and 410C, within wood chip 504. However, enlarged oval 506 depicts an enlarged area of wood chip 508, which has not yet entered the target area 122 and received an application of the constant RF energy 400. Accordingly, enlarged oval 506 shows the capillaries 158 of the wood chip 508 are substantially intact, and present a plurality of wood sugars 160, resins 162, and other materials 164 that have yet to be released.

Figure 6A:
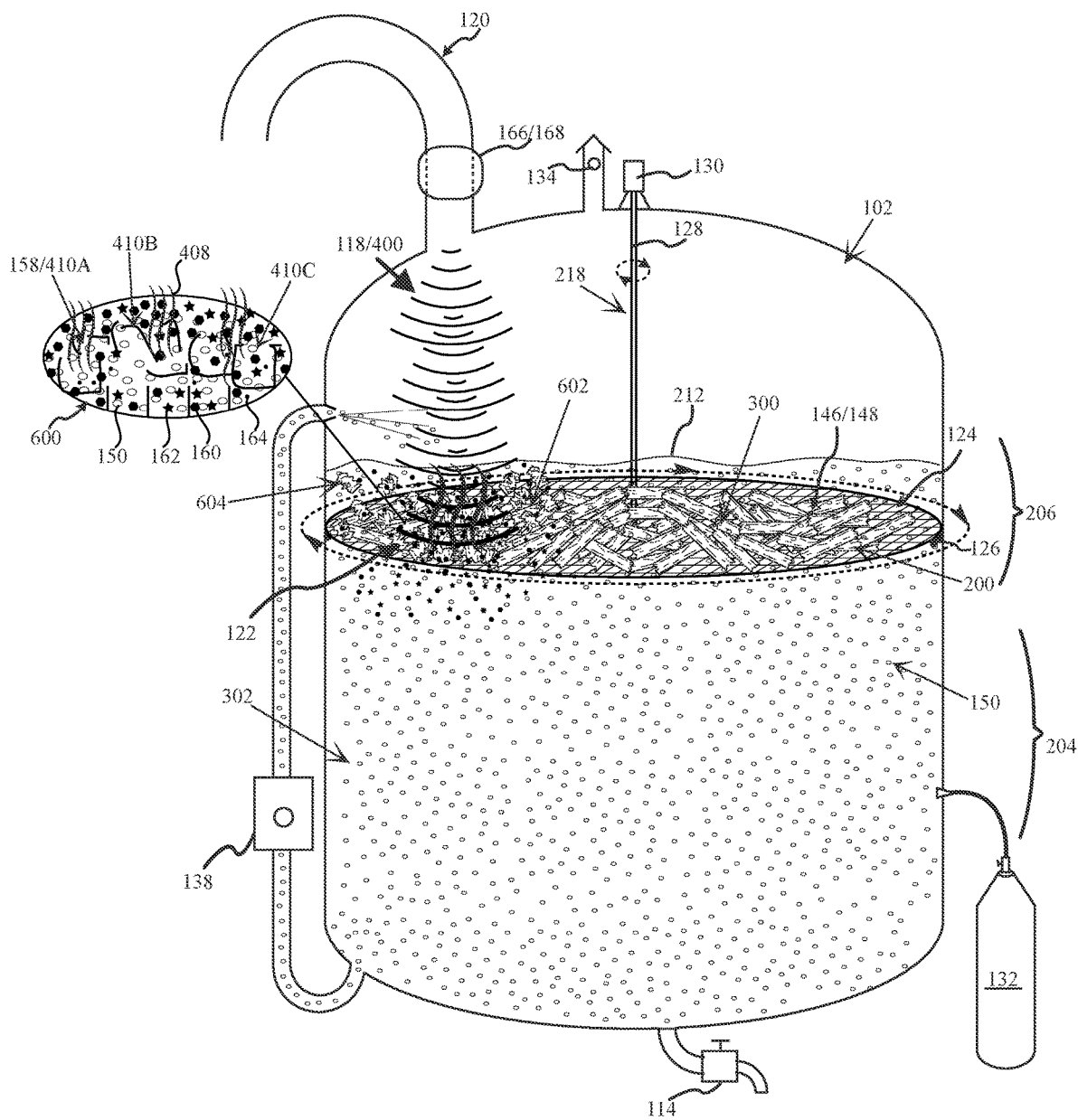
FIG. 6A illustrates a cut through view of the vessel shown in FIG. 1 of the rapid aging system and more specifically the vessel with a wood material supporting platform, with continued application of the RF energy upon the opaque mixture accumulating proximate to the surface of the liquid and the developing absorption of at least dissolved wood sugars by the distilled ethyl alcohol in accordance with at least one embodiment of the present invention.
Figure 6B:
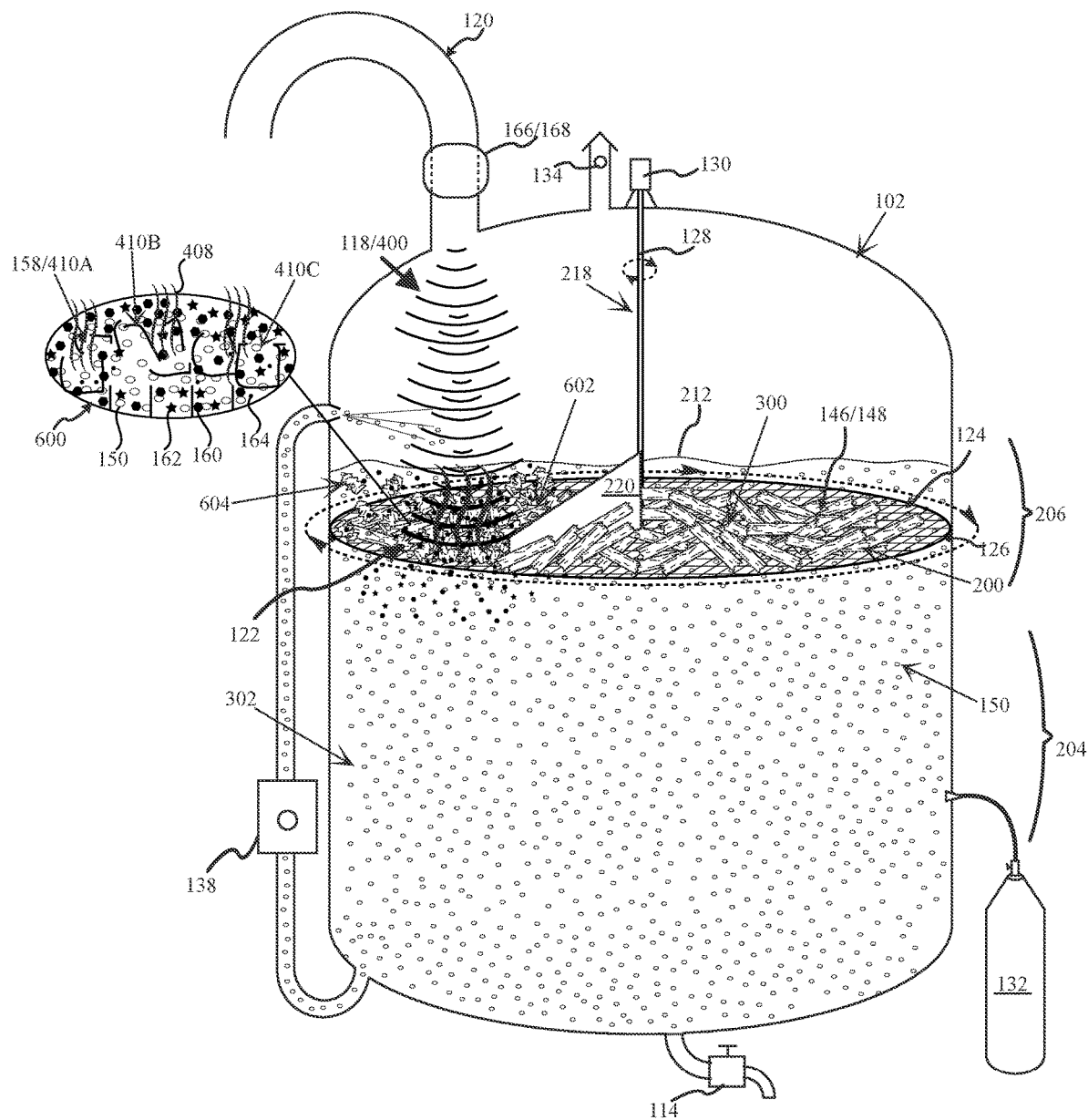
FIG. 6B illustrates a cut through view of the vessel shown in FIG. 1 of the rapid aging system and more specifically the vessel with a wood material supporting platform and at least one sweeper blade, with continued application of the RF energy upon the opaque mixture accumulating proximate to the surface of the liquid and the developing absorption of at least dissolved wood sugars by the distilled ethyl alcohol in accordance with at least one embodiment of the present invention.

Turning to FIGS. 6A and 6B, convection is movement caused within a fluid by the tendency of hotter materials, which are therefore less dense, to rise while colder, and therefore denser, materials sink under the force of gravity.

The concentrated heating of the wood chips 148 also results in heating of the distilled ethyl alcohol 150 that is proximate to and/or within the heated wood chips 148, as well as the heating of the wood sugars 160, resins 162 and other materials 164 that may have been dissolved into, or dislodged by, the distilled ethyl alcohol 150.

Again, as noted above, the resulting heating of the wood chips 148 and the distilled ethyl alcohol 150 is substantially localized event occurring at and in the general proximity to the locations where the focused narrow beam of constant RF energy 118/400 is incident upon the opaquest material, e.g., the saturated wood chips 148 within the target area 122.

As is shown in enlarged oval 600 the capillaries 158/410 are now even further expanding, and/or degrading such that even more wood sugars 160, resins 162 and other materials 164 are interacting with the distilled ethyl alcohol 150, and freely flowing away from the wood chips 148 for dissipation throughout the opaque mixture 200. The opaque mixture 200 is still somewhat separated into an opaque portion 300 and a transparent portion 302, but thermally driven mixing, as well as the circulation system 106 is resulting in desired disbursement of wood sugars 160, resins 162 and other materials 164 resulting in an overall increase of opacity within the distilled ethyl alcohol 150 itself.

This concentrated localized heating cannot be achieved or otherwise equivalized to general heating of the overall mixture, for as previously stated, if the entire mixture was heated to the resulting temperatures produced by the advantageous skinning effect of the constant RF energy, breakdown of the wood chips 148, and most specifically the capillaries 158, might occur but it would be pointless accomplishment as the distilled ethyl alcohol 150 would be destroyed.

In keeping with the conventions of convection these heated materials being less dense, will rise in the vessel 102. As the platform 124 is intended to contain the plurality of units of wood 146, e.g., the wood chips 148, proximate to the surface 212 to start with, the rising material may be more of a rising froth rather than a distinct column as would be expected in the absence of the platform 124 and if the plurality of units of wood 146 were initially resting at the bottom of the vessel 102. Still, the localized extreme heating can and will induce heated material 602, e.g., entire wood chips 148 and/or at least pieces 604 thereof to rise towards the surface 212. Indeed, as a result of the applied constant RF energy 118/400 the original wood chips 148 will break down in to smaller wooden element, i.e., pieces 604.

The rising of heated materials 602 presents more opaque elements for interaction with the constant RF energy 400 within the target area 122, as well as the dissolving by opaque materials (more specifically the wood sugars 160, resins 162 and other materials 164) into solution by the distilled ethyl alcohol 150.

Figure 7A:
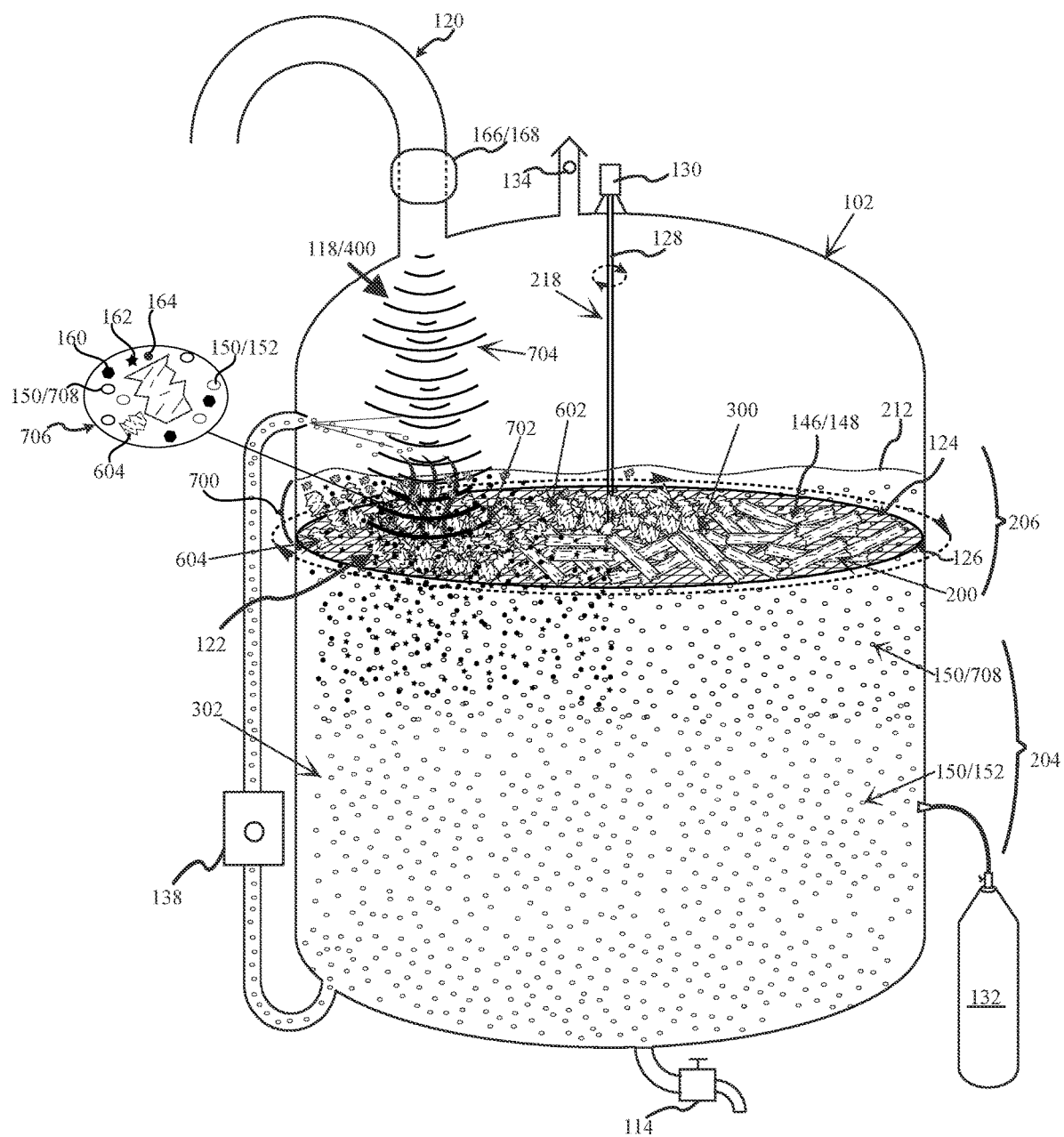
FIG. 7A illustrates a cut through view of the vessel shown in FIG. 1 of the rapid aging system and more specifically the vessel with a wood material supporting platform, with continued application of the RF energy upon the opaque mixture accumulating proximate to the surface of the liquid and the increasing opacity of the ethyl alcohol in accordance with at least one embodiment of the present invention.
Figure 7B:
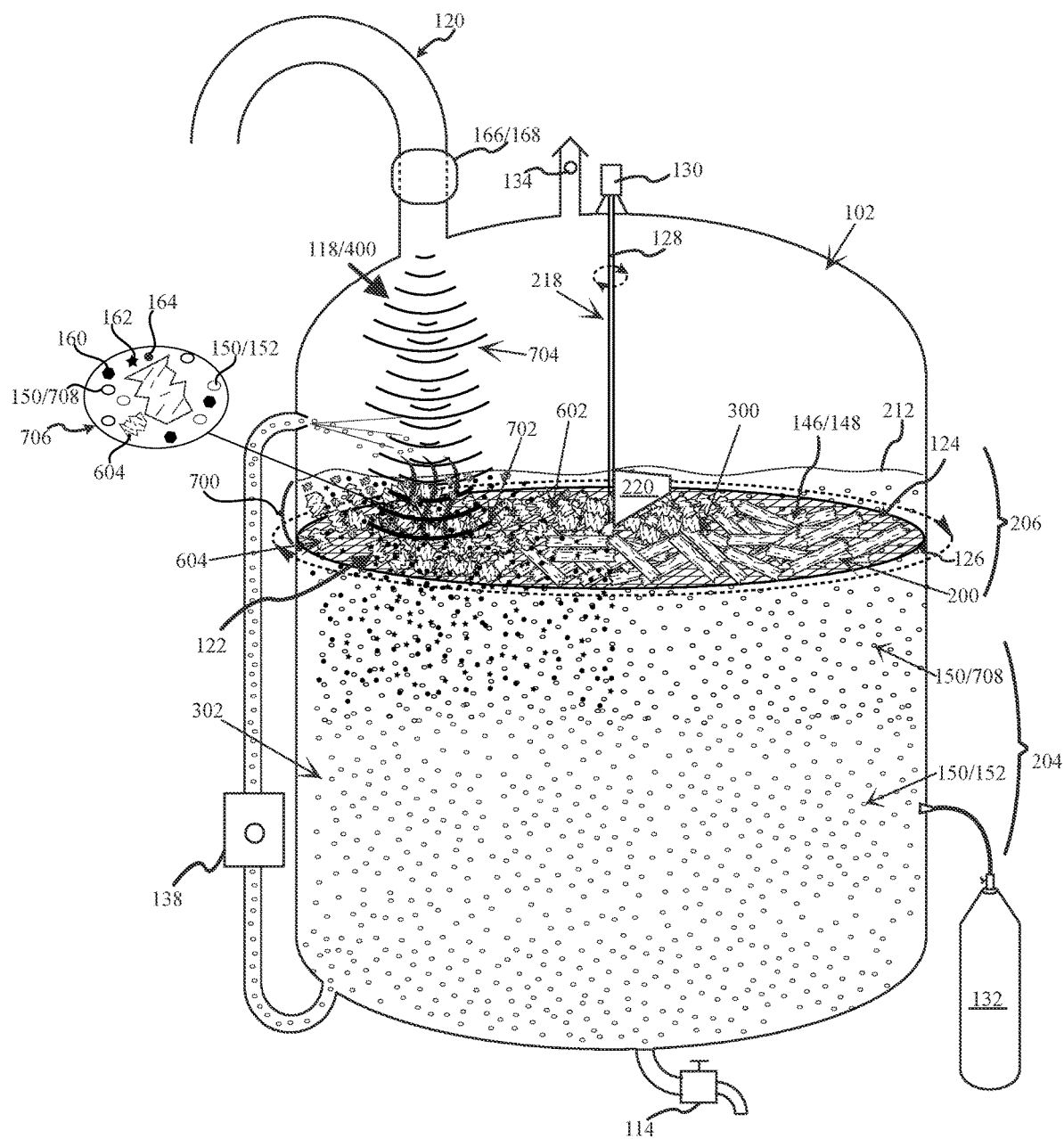
FIG. 7B illustrates a cut through view of the vessel shown in FIG. 1 of the rapid aging system and more specifically the vessel with a wood material supporting platform and at least one sweeper blade, with continued application of the RF energy upon the opaque mixture accumulating proximate to the surface of the liquid and the increasing opacity of the ethyl alcohol in accordance with at least one embodiment of the present invention.

In FIGS. 7A and 7B, it will be appreciated that the application of the constant RF energy 118/400 has been effective in fracturing and expanding the wood chips 148 into smaller components of wood material, i.e., pieces 604.

As the distilled ethyl alcohol 150 is indeed a liquid with a high concentration of alcohol, and alcohol has a lower evaporation point than water, the heating of the wood chips 148 and resulting heating of the proximate distilled ethyl alcohol 150 as a direct result of the oscillation to induce fracturing of the capillaries 158 could result in unintentionally evaporating away some of the alcohol. By circulating the opaque mixture 200 the intense and concentrated heat may be applied to the opaque materials to facilitate the release of the wood sugars 160, resins 162 and other materials 164, but the circulation of the liquid opaque mixture 200 as a whole helps to minimize the evaporative loss and somewhat cools the liquid most proximate to the sites of constant RF energy 400 impingement.

It is this circulation that helps to ensure that the temperature of the overall opaque mixture 200 is greater than about sixty degrees Celsius (60° C.), and for at least one embodiment, the ambient temperature of the overall opaque mixture 200 is about sixty-five point five degrees Celsius (65.5° C.).

In addition, the constant circulation continually refreshes the surface 212 as the constant RF energy 400 is applied, thereby ensuring that the opaque elements of the opaque mixture 200 proximate to the surface 212 receive high concentration of the predetermined frequency of the constant RF energy 400.

As may be appreciated in FIGS. 7A and 7B, the high concentration of opaque materials 700 present in the opaque mixture 200 proximate to the surface 212 results in the majority of the constant RF energy 400 interaction occurs proximate to the surface, with less RF energy being received by the materials below. This has been conceptually illustrated with the use of thick lines 702 in the constant RF energy 400 within the opaque materials 700 proximate to the surface 212, with lighter lines 704 in the constant RF energy 400 above the surface 212. To the extent that some RF energy 400 may penetrate below the platform 124, here again the interaction with opaque material—the units of wood 146/wood chips 148 comprising at least a portion of the opaque mixture 200 is less than the interaction between the platform 124 and surface 212 as there is less opaque material 200—the units of wood 146/wood chips 148 comprising at least a portion of the opaque mixture, in this lower region.

This permits the opaque materials proximate to the surface to be hotter while the materials at the bottom are cooler. In other words, the opaque mixture 200 proximate to the surface 212 is hotter than the opaque mixture 200 proximate to the bottom of the vessel 102. It will also be appreciated that as the opaque mixture 200 is circulated, the opacity is beginning to even out throughout the mixture. It will also be appreciated in enlarged oval 706 that some of the dotted circles 152 representing substantially transparent distilled ethyl alcohol 150 are now appearing as solid circles 708 to conceptually indicate that the distilled ethyl alcohol 150 itself is becoming somewhat opaque, though still translucent.

Moreover, circulation of the opaque mixture 200 advantageously permits a degree of overall temperature control upon the opaque mixture 200. Indeed, where the operation of RAS 100 is at least in part directed by the at least one computer 136 (see FIG. 1), the control of the RF generator 116 (see again FIG. 1) and the circulation system 106 may provide even greater overall regulation of the overall temperature of the opaque mixture 200.

For at least one embodiment, the aperture 104 may be fitted with a glass or other material transparent to the constant RF energy. For yet another embodiment, the aperture 104 may be physically open such that rising fumes and gasses from the heated opaque mixture may actually enter at least a portion of the waveguide 120. In at least one such embodiment, the waveguide 120 may be fitted with a heat exchanger 168 structured and arranged to cool the rising vapors such that they are condensed back into liquid and returned to the opaque mixture 200.

Figure 8A:
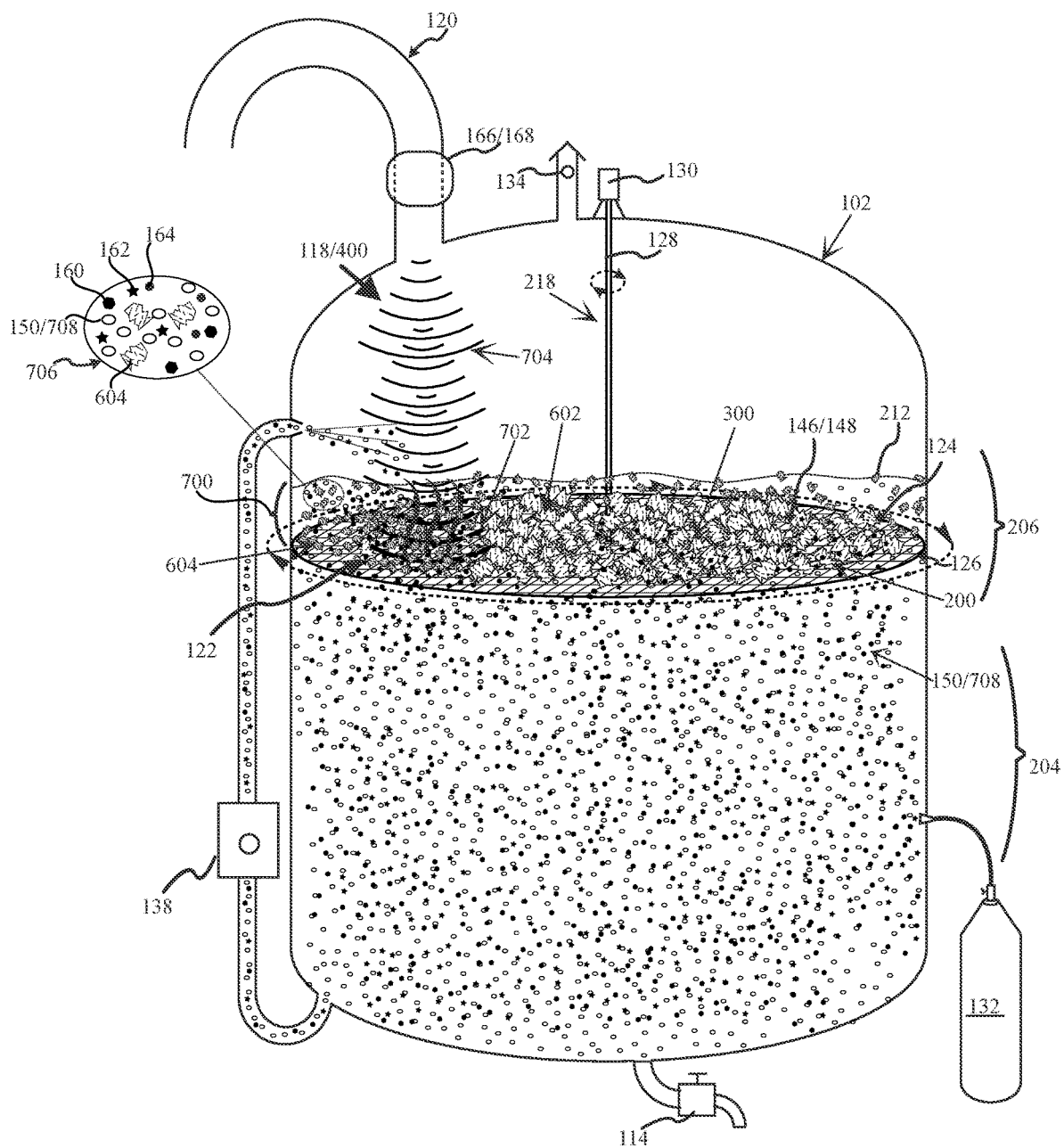
FIG. 8A illustrates a cut through view of the vessel shown in FIG. 1 of the rapid aging system and more specifically the vessel with a wood material supporting platform, with continued application of the RF energy upon the opaque mixture having reduced the original wood chips to smaller wood parts in accordance with at least one embodiment of the present invention.
Figure 8B:
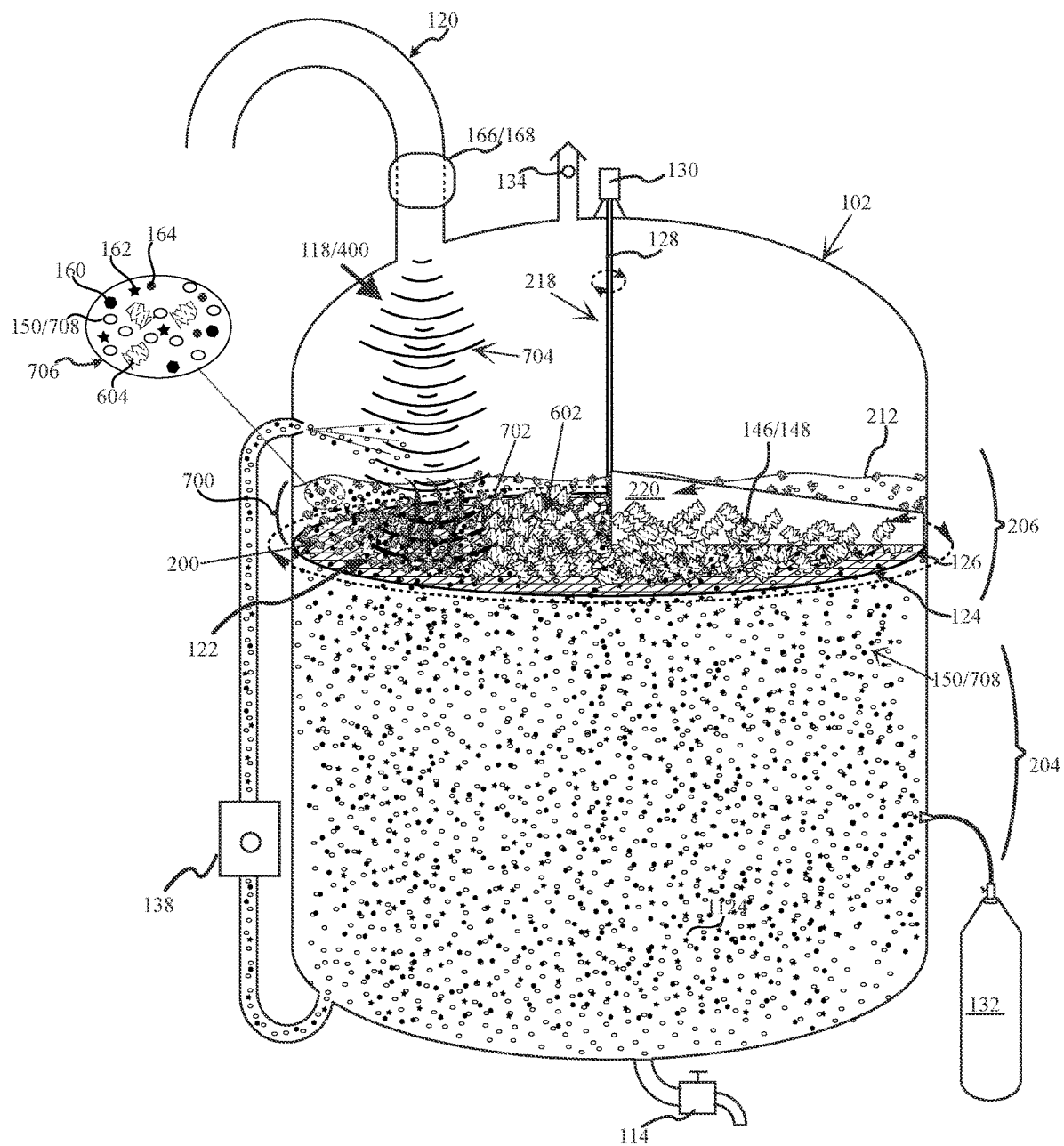
FIG. 8B illustrates a cut through view of the vessel shown in FIG. 1 of the rapid aging system and more specifically the vessel with a wood material supporting platform and at least one sweeper blade, with continued application of the RF energy upon the opaque mixture having reduced the original wood chips to smaller wood parts in in accordance with at least one embodiment of the present invention.

In FIGS. 8A and 8B, the rapid aging process of RAS 100 has progressed and essentially all of the wood chips 148 have been reduced to lesser pieces 604. In addition, the circulation has aided in further distributing opaque materials throughout the opaque mixture 200. Indeed, as the wood sugars 160, resins 162 and other materials 164 have been released from the wood into the distilled ethyl alcohol 150, and at least some of these elements being dissolved therein, the opacity of the opaque mixture 200 as a whole is increasing. The dotted circles 152 (not shown in FIGS. 8A and 8B) indicating the initial transparency of the distilled ethyl alcohol 150 in prior drawings are now replaced by solid circles 800 indicating an overall darkening of the liquid, see enlarged oval 802.

As wood sugars 160 and resins 162 are dissolved into the distilled ethyl alcohol 150 carboxylic acids are formed, which in turn react with the distilled ethyl alcohol 150 to form esters through a process known as esterification. This is a process that traditionally occurs very slowly and gradually over long periods of time in traditional barrel aging.

However, the RAS 100 and more specifically the precise application of constant RF energy 400 at a preselected frequency advantageously permits rapid development of esterification. Still, it will be understood and appreciated that the applied constant RF energy 400 is not intended to act upon the alcohol or water molecules specifically. Some interaction may occur, but is of such statistical insignificance in comparison to the intended fracturing of the capillaries 158 of the saturated wood chips 148 that what interaction between the constant RF energy and the alcohol or water molecules apart from the wood chips 148 may be considered irrelevant and not of relevance to the advantageous teachings of the rapid aging. The byproduct of heat—also resulting from the rapid oscillation of the molecular structure of the wood chips 148 as induced by the constant RF energy, aids in the release of the wood sugars 160, resins 162 and other materials 164 for the creation of compounds (esters) as the result of accelerated polymer chemistry, but this resulting heat cannot and should not be looked upon as the sole intended purpose of the application of the constant RF energy.

As noted above, for at least one embodiment the first proof of the distilled ethyl alcohol 150 is about 125 proof. At this proof, the concentration of alcohol in the distilled ethyl alcohol is highly effective as a solvent advantageously permitting the rapid and nearly complete release of at least the wood sugars 160 from the capillaries 158 (not shown in FIGS. 8A and 8B). However, these released wood sugars 160 are still complex compounds, phenolic compounds specifically.

For the desired flavor, color and characteristics of an aged spirit, it is essential that these complex compounds be further broken down and dispersed. The addition of water aids in this process because water permits the complex compounds (the Phenolic compounds) to oxidize—which the initial higher proof of alcohol does not.

Figure 9A:
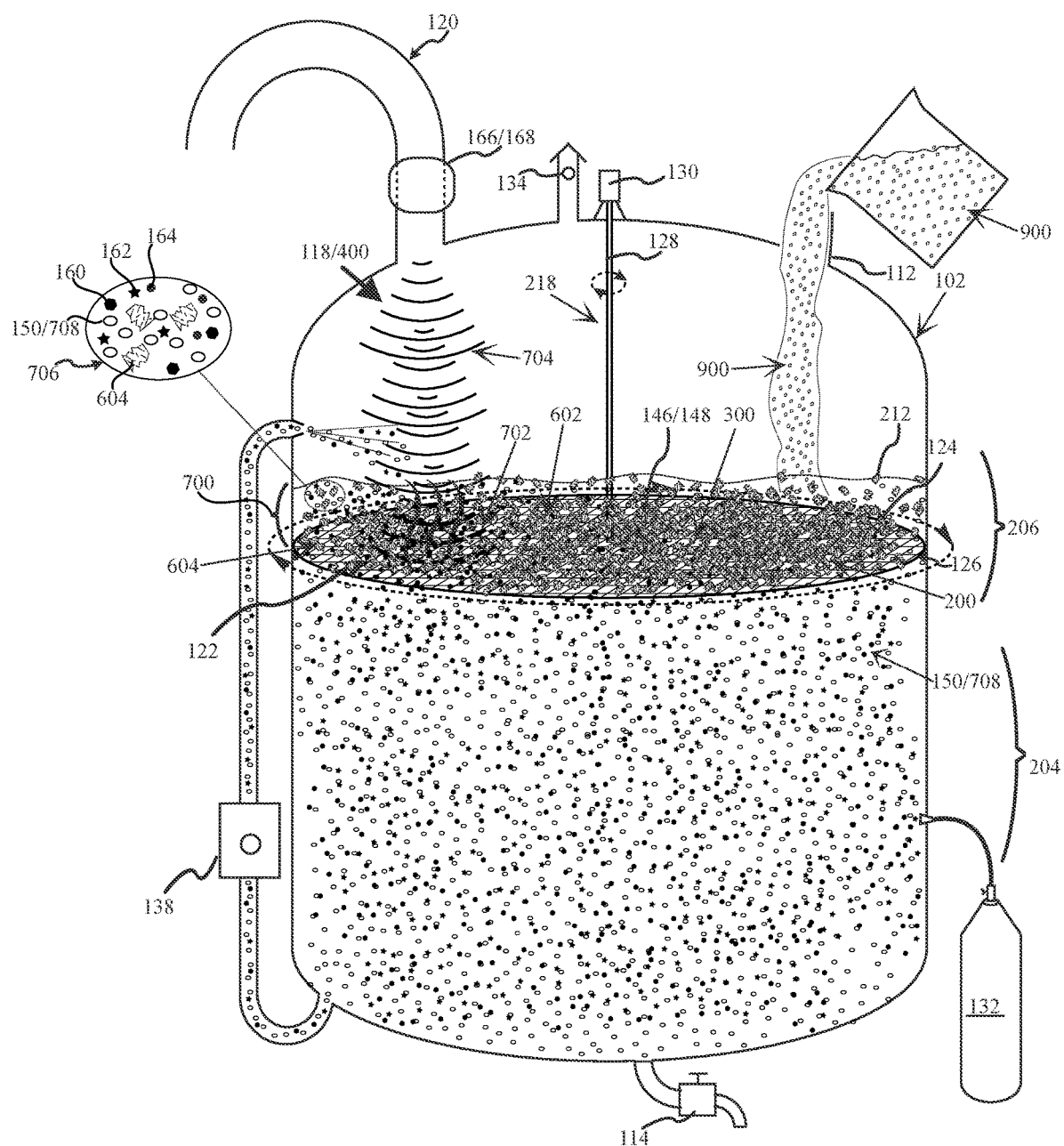
FIG. 9A illustrates a cut through view of the vessel shown in FIG. 1 of the rapid aging system and more specifically the vessel with a wood material supporting platform, with continued application of the RF energy upon the opaque mixture accumulating proximate to the surface of the liquid and the addition of extra water in accordance with at least one embodiment of the present invention.
Figure 9B:
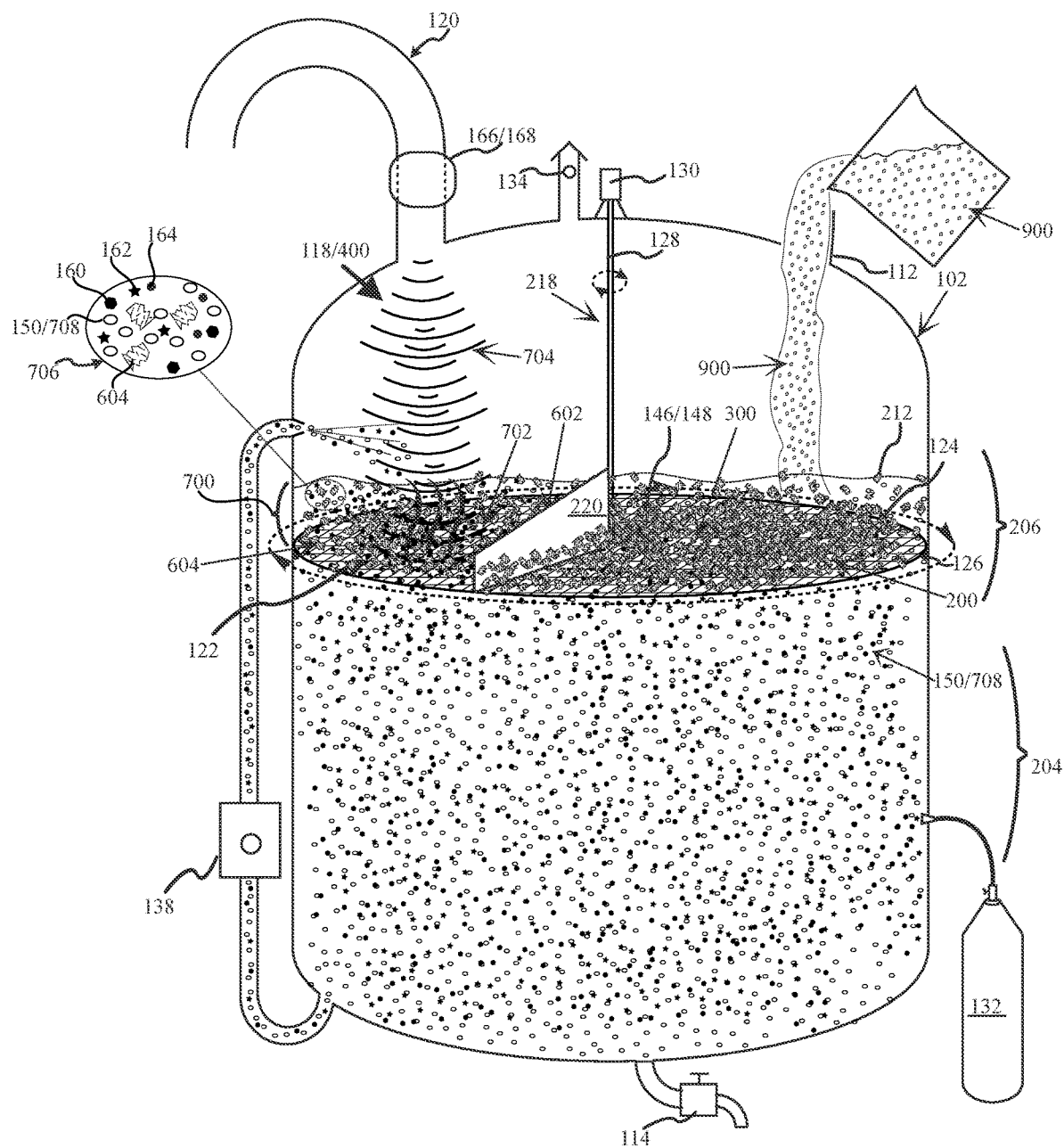
FIG. 9B illustrates a cut through view of the vessel shown in FIG. 1 of the rapid aging system and more specifically the vessel with a wood material supporting platform and at least one sweeper blade, with continued application of the RF energy upon the opaque mixture accumulating proximate to the surface of the liquid and the addition of extra water in accordance with at least one embodiment of the present invention.

As such, for at least one embodiment as is shown in FIGS. 9A and 9B, after the rapid aging process of RAS 100 has been performed for a period of time to sufficiently achieve the release of most of the wood sugars 160, resins 162 and other materials 164, a quantity of water 900 is added to the opaque mixture 200 within the vessel 102. For at least one embodiment the addition of water 900 may be achieved pouring the water through hatch 112.

The addition of this water 900 results in a second proof of the opaque mixture that is lower than the first proof of the initial distilled ethyl alcohol 150. This lower proof with the newly added water 900 allows the complex compounds (the Phenolic compounds) to oxidize more completely than is possible when the opaque mixture 200 is kept at the first proof. For at least one embodiment this second lower proof is about one hundred thirteen proof (113 Proof).

Moreover, for at least one embodiment seeking to provide a high quality rapidly aged spirit such as, but not limited to, bourbon or whiskey as the result of the rapid aging of the distilled ethyl alcohol 150, it is the combination of having a high first proof for the solvent assisted release of at least the wood sugars 160 in combination with the subsequent addition of water to achieve a second lower proof that achieves the desired result. Starting with a lower first proof does not result in as efficient and complete a release of the wood sugars 160, and omitting the additional water to drop to the second proof more favorable to oxidation does not result in the same level of quality in the resulting rapidly aged distilled ethyl alcohol 150.

As noted above, the creation of an aged spirit deemed enjoyable by master tasters in the beverage arts, typically includes the development of congeners which are the substances other than alcohol or ethanol that are responsible for most of the taste and aroma of the distilled alcoholic beverage. Under this same label of "congeners" are also undesirable compounds such as butane, methanol, hydarzines, acetates and acetaldehydes.

Fortunately, while good and desirable congeners are fairly stable and may actually improve with oxidation, the undesirable congeners tend to outgas from the liquid as a result of oxidation. As such, and to foster the development of even more esters as are the result of chemical bonding of an alcohol or phenol to an acid, specifically a catholic or phenolic acid, for at least one embodiment, RAS 100 includes an oxygenator 132.

Figure 10A:
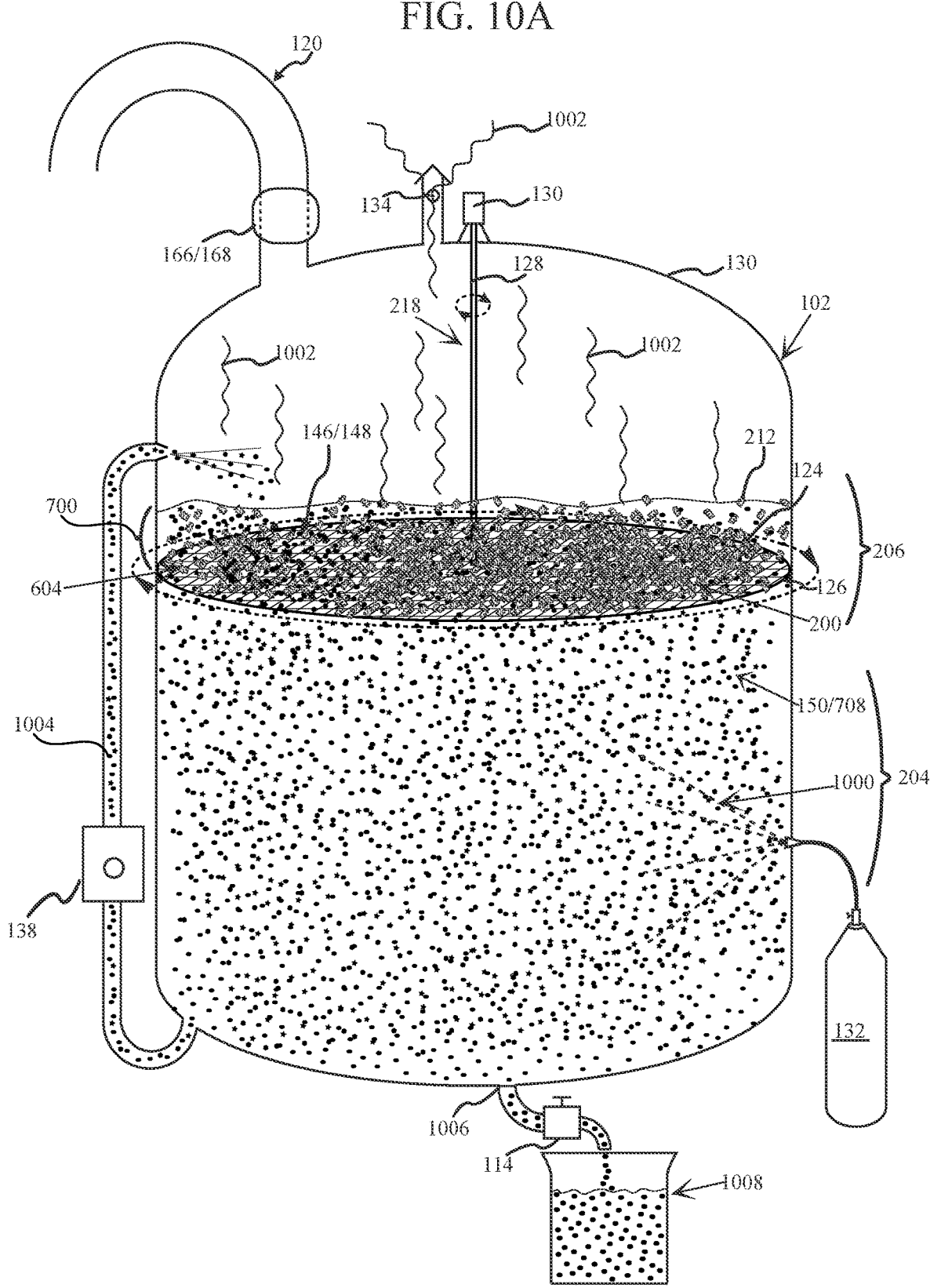
FIG. 10A illustrates a cut through view of the vessel shown in FIG. 1 of the rapid aging system and more specifically the vessel with a wood material supporting platform, following the cessation of application of the RF energy, the opaque mixture being oxygenated and out gassing to provide a finished rapidly aged spirit in accordance with at least one embodiment of the present invention.
Figure 10B:
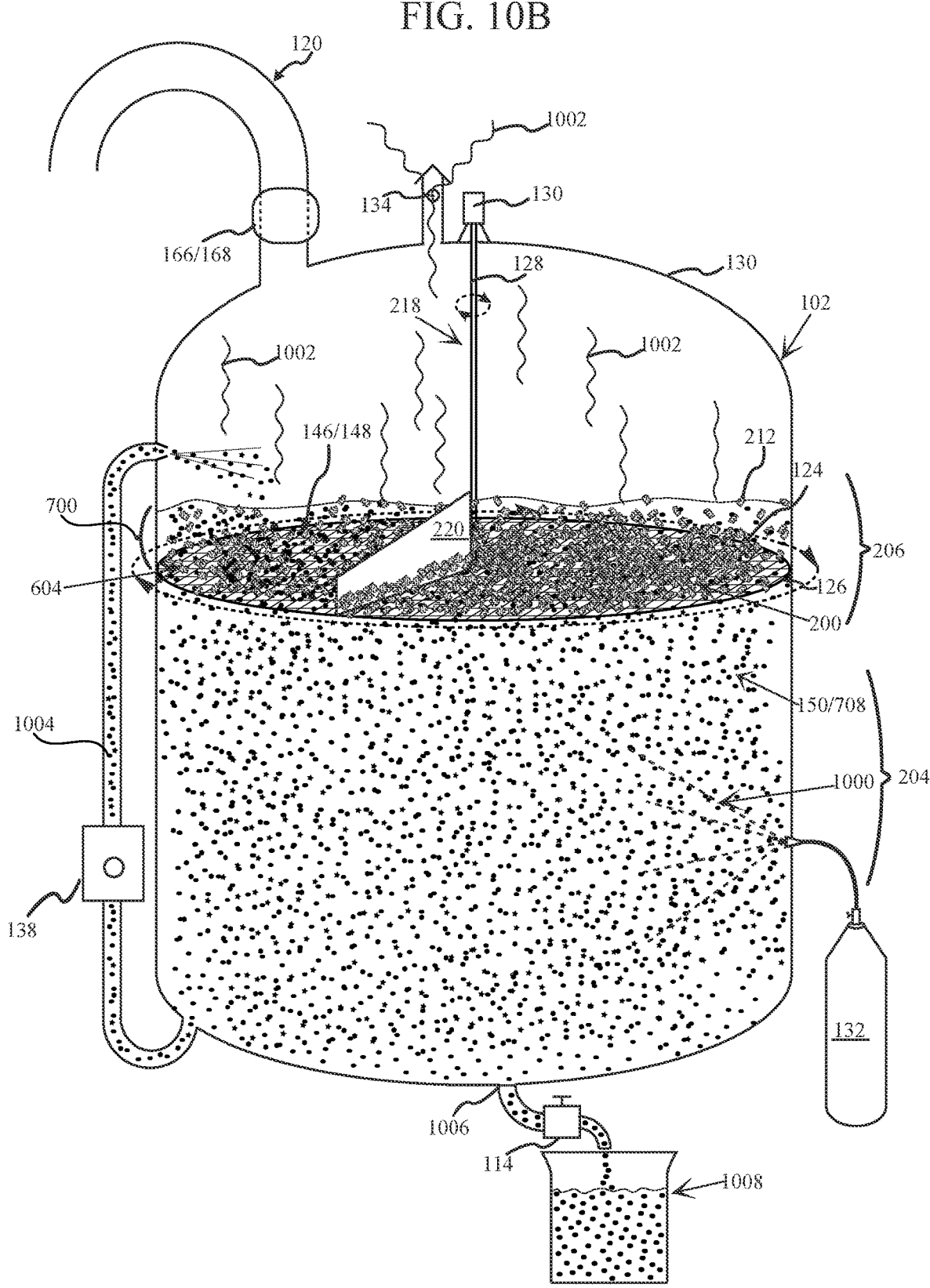
FIG. 10B illustrates a cut through view of the vessel shown in FIG. 1 of the rapid aging system and more specifically the vessel with a wood material supporting platform and at least one sweeper blade, following the cessation of application of the RF energy, the opaque mixture being oxygenated and out gassing to provide a finished rapidly aged spirit in accordance with at least one embodiment of the present invention.
Figure 12:
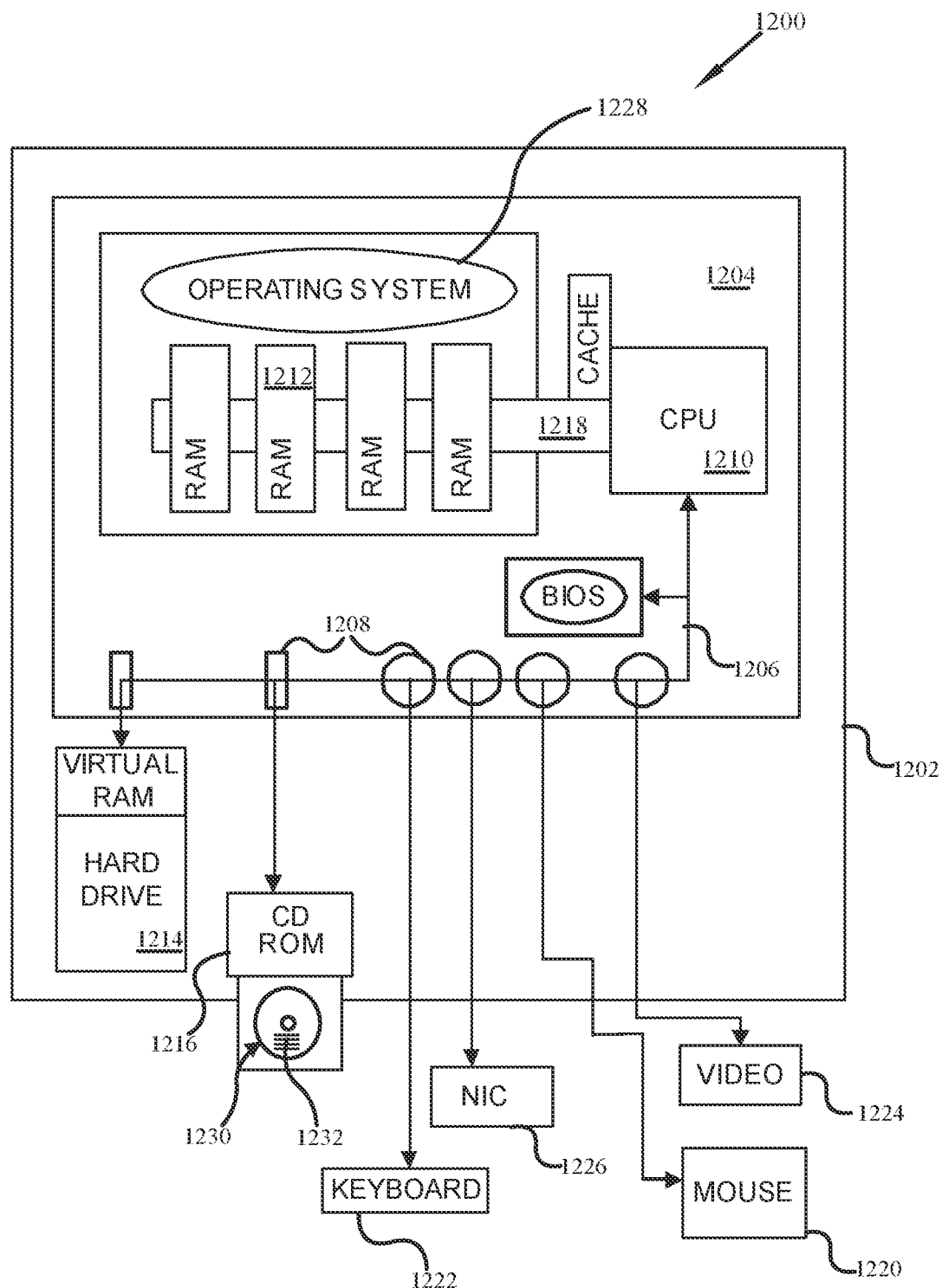
FIG. 12 is a high-level block diagram of a computer system in accordance with at least one embodiment.

Some congeners are desirable while others represent undesirable elements. As shown in FIGS. 10A and 10B, while the opaque mixture 200 is still very warm, such as about 43.3 degrees Celsius, for at least one embodiment, oxygen 1000 is provided into the opaque mixture 200 from the oxygenator 132. Although shown for ease of illustration and discussion to be injected from the side, the oxygen 1000 may be introduced through a bubbler stone, ring, jet or combination thereof and from one location or a plurality of locations within the vessel 102.

As circulation of the opaque mixture 200 is continued during the oxygenation process, the congeners and other volatiles resulting within the opaque mixture 200 from the rapid aging process as described above are provided ample opportunity to react with the introduced oxygen with the result of off gasses 1002 being released and vented from the vessel 102. For at least one embodiment, one or more sensors may be disposed within the vent to detect and measure the presence or absence of gasses and/or gaseous substances for the determination of when the off-gassing process has been substantially concluded.

With the process of rapid aging of the distilled ethyl alcohol 150 essentially concluded, the solid circles 708 have now transitioned to solid dots 1004 to conceptually illustrate that the distilled ethyl alcohol 150 is now itself uniformly opaque. The opaque mixture 200 is extracted from the vessel 102, such as through a drain 114. To provide the expected essentially clear but colored aged spirit, the extracted opaque mixture 200 is filtered through at least one filter 1006 to remove wood and other particle residue.

The resulting filtered rapidly aged ethyl alcohol 1008 is now ready for bottling, distribution and consumption.

Moreover, for at least one embodiment, the RAS 100 may be summarized as a system 100 for rapid aging of a distilled ethyl alcohol 150, including: a vessel 102 including: at least one aperture 104 suitable for the introduction of radio frequency (RF) energy at a preselected frequency selected to pass through transparent material and be absorbed by opaque material, the at least one aperture 104 above a target area 122; at least one liquid circulation system 106 structured and arranged to circulate a liquid from a lower portion of the vessel 102 to an upper portion of the vessel 102; and a platform 124 structured and arranged to substantially contain a plurality of units of wood 146 as the opaque material proximate to a surface of the liquid within the vessel 102, each unit of wood 146 having a plurality of capillaries 158 containing at least wood sugar(s) 160 and resin(s) 162, the capillaries 158 defined by molecular bonds of molecules; a wood agitation system 218 structed and arranged to move the plurality of units of wood 146 below the aperture 104 and through the target area 122; an RF generator 116 structured and arranged to provide a constant RF energy 400 at the predetermined frequency to induce oscillation of molecules within the opaque material disposed within the vessel 102; at least one waveguide 120 disposed between the RF generator 116 and the vessel 102, the at least one waveguide 120 structured and arranged to convey the generated predetermined frequency from the RF generator 116 to the at least one aperture 104; and an oxygenator 132 structured and arranged to dispose oxygen within an opaque liquid mixture of ethyl alcohol and ethyl alcohol saturated units of wood 146 disposed within the vessel 102 and outgas congeners from the liquid, the vessel 102 further providing at least one vent 134 structured and arranged to vent 134 the outgassed congeners.

With respect to the above-described processes of rapidly aging a distilled ethyl alcohol 150, FIG. 11 presents a high-level flow diagram illustrating at least one method 1100 according to an embodiment of rapidly aging a distilled ethyl alcohol 150. It will be understood and appreciated that the described method 1100 need not be performed in the order in which it is herein presented, but that this is merely exemplary of one method of rapid aging of distilled ethyl alcohol 150, such as may be achieved with at least one embodiment of RAS 100.

FIG. 11 conceptually illustrates a high-level flow diagram depicting at least one method 900 for rapidly aging a distilled ethyl alcohol 150, which may be further understood and appreciated with respect to FIGS. 2-10. Moreover, method 1100 generally begins with providing a vessel 102 having at least one aperture 104 for the introduction of RF energy into the vessel, a platform 124, a circulation system 106, and a wood agitation system 218, block 1102.

It will be understood and appreciated that the vessel 102 may be substantially as described above, the aperture 104 connected by a waveguide 120 to an RF generator 116 structured and arranged to provide constant RF energy at a predetermined frequency.

Method 1100 continues with the providing of a substantially transparent distilled ethyl alcohol 150 having a first proof, block 1104 (see FIG. 1). Additionally, a plurality of units of wood 146 (see FIG. 1) having a plurality of capillaries containing wood sugar are provided, block 1106.

The plurality of units of wood 146 and distilled ethyl alcohol 150 are combined to provide an opaque mixture 200 (see FIG. 2), block 1108. For at least one optional embodiment, the opaque mixture 200 is rested to fully saturate the at least one unit of wood 146 with the distilled ethyl alcohol 150, optional block 1110. As an additional option, this combination and resting of the opaque mixture may occur outside of the vessel 102, optional block 1112.

Ultimately, the opaque mixture 200 is disposed within the vessel 102, the units of wood 146, aka the wood chips 148 supported by the platform 124, block 1114. With the opaque mixture 200 so disposed within the vessel 102, a constant RF energy at a frequency preselected to impinge on the opaque material within the target area 122 is applied, block 1116. As discussed above, this applied constant RF will impinge on the most opaque material first—which for the present invention is the saturated wood chips 148.

Although RF energy may be applied to induce heating without significant degradation or destruction of the targeted material, for the present invention the constant RF energy is intentionally applied as a narrow band to achieve a skinning effect upon the wood chips 148, and for the purpose of intentionally fracturing the cellular structure of the capillaries 158 of the wood chips 148. The byproduct of heat is also advantageous in further inducing enablement, softening and distortion and degradation of the capillaries 158 of the units of wood 146 and permits the alcohol of the distilled ethyl alcohol 150 to act as a solvent and dissolve at least the wood sugars 160.

Circulation of the opaque mixture 200 may occur prior to the application of the constant RF energy. Decision 1118 checks to see if the opaque mixture is being circulated and if the wood agitation system 218 is operating as well. If the evaluation is "No", the circulation system is engaged, block 1120. If the evaluation is "Yes", a second evaluation is performed to determine if the cycle of rapid aging is complete, decision 1122. For at least one embodiment, the cycle for rapid aging is based on time, such as an hour.

If the evaluation of decision 1122 is "No," the cycle continues with the application of RF energy, returning to block 1116. If the evaluation of decision is "Yes," the application of RF energy is halted, and the opaque mixture 200 is oxygenated, block 1124. As discussed above, for at least one embodiment, an additional quantity of water may be optionally added to drop the proof from a first proof to a second proof. For such an embodiment, the cycle evaluation may have a "Partial" state, indicating it is now the proper time to add the additional water, block 1126.

Following the addition of the water at block 1126, the method returns to block 1116 for continued application of RF energy 400. After the oxygenation of block 1124, the method continues with the filtering of the opaque mixture 200 to provide the now aged distilled ethyl alcohol spirit for bottling, packaging, shipping, and consumption, block 1126.

Moreover, for at least one embodiment, a method 1100 of rapid aging a distilled ethyl alcohol with RF energy and a wood material supporting platform may be summarized as providing a vessel 102 having at least one aperture 104 suitable for the introduction of radio frequency (RF) energy at a preselected frequency into the vessel 102 in a target area 122, the vessel 102 further providing a platform 124 structured and arranged to substantially contain saturated wooden material below the at least one aperture 104, the vessel 102 further providing a wood agitator structed and arranged to cycle saturated wooden material through the target area 122; providing a distilled ethyl alcohol 150 having a first proof; providing a plurality of units of wood 146, each unit of wood 146 having a plurality of capillaries 158 containing at least wood sugars 160 and resins 162, the capillaries 158 defined by molecular bonds of molecules; combining the distilled ethyl alcohol 150 and plurality of units of wood 146 to provide an opaque mixture 200, the opaque mixture 200 disposed within the vessel 102 with the plurality of units of wood 146 supported by the platform 124, the opaque mixture 200 having a surface disposed below the at least one aperture 104; circulating at least the ethyl alcohol from a lower portion of the vessel 102 to an upper portion of the vessel 102 to continuously refresh the surface; cycling the units of wood 146 through the target area 122; and applying a constant RF energy 400 through the aperture 104 at the preselected frequency, the applied constant RF energy 400 exciting polar molecules of the capillaries 158 of the units of wood 146 within the target area 122 to fracture and expand the capillaries 158, the fractured and expanded capillaries 158 absorbing the alcohol of the distilled ethyl alcohol 150, the absorbed alcohol dissolving at least a portion of the wood sugars 160 and resins 162 into the distilled ethyl alcohol 150 to rapidly age the distilled ethyl alcohol 150.

Alcoholic beverages are often an acquired taste, and distilled alcoholic spirits often even more so. What is pleasing and enjoyable to one person may not be to another. However, even within the spectrum of different viewpoints and expectations, there are some general norms which have been established. Is the color rich of caramel or thin like aged varnish? Are there tasting notes of vanilla, nutmeg, peatmoss? Is the alcohol profile intense at first sip and smooth at the finish, or is there an intensifying heat or burn?

Subjective though these criteria may be, there is often a common desire among people to find ways to convey a mutual understanding and appreciation of a thing, and an understood desire for one person's view and description to be accepted and perhaps even repeated by another person. This definitely applies to distilled spirits, and has permitted the development of an extensive system of comparisons and competitions for the ranking and evaluations of comparative distilled spirits.

With respect to the present invention of RAS 100 and the described process of rapid aging, multiple respected persons within the distilled spirits industry have agreed that an embodiment of the aging process performed over about twenty-four hours provides a rapidly aged distilled spirit that is essentially on par, as in equivalent to, a spirit resulting from ten years of traditional barrel aging. With respect to the issues of time and actual expenses for storage, care, maintenance, etc. . . . and even loss through evaporation, the present invention may be easily appreciated as a highly advantageous alternative.

To expand upon the initial suggestion of at least one computer 136 being adapted to control RAS 100, and potentially the computer control system for the RF generator 116, FIG. 10 is a high level block diagram of an exemplary computer system 1200 such as may be provided for the at least one computer or other computing elements whether provided as distinct individual systems or integrated together in one or more computer systems.

Computer system 1200 has a case 1202, enclosing a main board 1204. The main board 1204 has a system bus 1206, connection ports 1208, a processing unit, such as Central Processing Unit (CPU) 1210 with at least one microprocessor (not shown) and a memory storage device, such as main memory 1212, hard drive 1214 and CD/DVD ROM drive 1216.

Memory bus 1218 couples main memory 1212 to the CPU 1210. A system bus 1206 couples the hard disc drive 1214, CD/DVD ROM drive 1216 and connection ports 1208 to the CPU 1210. Multiple input devices may be provided, such as, for example, a mouse 1220 and keyboard 1222. Multiple output devices may also be provided, such as, for example, a video monitor 1224 and a printer (not shown). As computer system 1200 is intended to be interconnected with other computer systems in the RAS 100 a combined input/output device such as at least one network interface card, or NIC 1226 is also provided.

Computer system 1200 may be a commercially available system, such as a desktop workstation unit provided by IBM, Dell Computers, Gateway, Apple, or other computer system provider. Computer system 1200 may also be a networked computer system, wherein memory storage components such as hard drive 1214, additional CPUs 1210 and output devices such as printers are provided by physically separate computer systems commonly connected together in the network.

Those skilled in the art will understand and appreciate that the physical composition of components and component interconnections are comprised by the computer system 1200, and select a computer system 1200 suitable for one or more of the computer systems incorporated in the formation and operation of RAS 100.

When computer system 1200 is activated, preferably an operating system 1228 will load into main memory 1212 as part of the boot strap startup sequence and ready the computer system 1200 for operation. At the simplest level, and in the most general sense, the tasks of an operating system fall into specific categories, such as, process management, device management (including application and User interface management) and memory management, for example. The form of the computer-readable medium 1230 and language of the program 1232 are understood to be appropriate for and functionally cooperate with the computer system 1200.

Moreover, variations of computer system 1200 may be adapted to provide the physical elements of one or more components comprising the at least one computer 136, the control systems (if any) within the RF generator 116, and other such devices or elements incorporated as part of RAS 100 as may be desired and appropriate for the methods and systems for the rapid aging of a distilled ethyl alcohol with RF energy as set forth herein.

It is to be understood that changes may be made in the above methods, systems and structures without departing from the scope hereof. It should thus be noted that the matter contained in the above description and/or shown in the accompanying drawings should be interpreted as illustrative and not in a limiting sense. The following claims are intended to cover all generic and specific features described herein, as well as all statements of the scope of the present method, system and structure, which, as a matter of language, might be said to fall therebetween.

What is claimed is:

1. A method for the rapid aging of distilled ethyl alcohol, comprising:
   providing a vessel having at least one aperture suitable for the introduction of radio frequency (RF) energy at a preselected frequency into the vessel in a target area, the vessel further providing a platform structured and arranged to substantially contain saturated wooden material below the at least one aperture, the vessel further providing a wood agitator structed and arranged to cycle saturated wooden material through the target area;
   providing a distilled ethyl alcohol having a first proof;
   providing a plurality of units of wood, each unit of wood having a plurality of capillaries containing at least wood sugar and resins, the capillaries defined by molecular bonds of molecules;
   combining the distilled ethyl alcohol and plurality of units of wood to provide an opaque mixture, the opaque mixture disposed within the vessel with the plurality of units of wood supported by the platform, the opaque mixture having a surface disposed below the at least one aperture;
   circulating at least the ethyl alcohol from a lower portion of the vessel to an upper portion of the vessel to continuously refresh the surface;
   cycling the units of wood through the target area; and
   applying a constant RF energy through the aperture at the preselected frequency, the applied constant RF energy exciting polar molecules of the capillaries of the units of wood within the target area to fracture and expand the capillaries, the fractured and expanded capillaries absorbing the alcohol of the distilled ethyl alcohol, the absorbed alcohol dissolving at least a portion of the wood sugars and resins into the distilled ethyl alcohol to rapidly age the distilled ethyl alcohol.

2. The method of claim 1, wherein the wood agitator is at least one sweeper fin extending from a central drive shaft disposed adjacent to the platform, the at least one sweeper fin structured and arranged to move the plurality of units of wood around on the platform.

3. The method of claim 1, wherein the wood agitator is a platform rotation system structured and arranged to rotate the platform below the at least one aperture.

4. The method of claim 3, wherein the platform rotation system includes a central drive shaft extending from a center point of the platform, the driveshaft driven by an external motor.

5. The method of claim 1, wherein the wood agitator includes a plurality of angled nozzles as part of at least one liquid circulating system, the angled nozzles disposed proximate to the platform at an angle to induce rotational flow to the circulated liquid.

6. The method of claim 1, wherein circulating at least the distilled ethyl alcohol further includes spraying at least a portion of the distilled ethyl alcohol the target area.

7. The method of claim 1, wherein the fracturing and expansion of the capillaries is due in part to localized heating of units of wood within the target area by the constant RF energy.

8. The method of claim 1, wherein the ratio of distilled ethyl alcohol to the plurality of units of wood in the opaque mixture disposed within the vessel is between 2.4 oz to 4.1 oz of wood per gallon.

9. A method for the rapid aging of distilled ethyl alcohol, comprising:
providing a vessel, including:
at least one aperture suitable for the introduction of radio frequency (RF) energy at a preselected frequency selected to pass through transparent material and be absorbed by opaque material in a target area;
at least one liquid circulating system structured and arranged to circulate a liquid from a lower portion of the vessel to an upper portion of the vessel;
a platform structured and arranged to substantially contain a plurality of units of wood as the opaque material proximate to a surface of the liquid within the vessel, each unit of wood having a plurality of capillaries containing at least wood sugar and resin, the capillaries defined by molecular bonds of molecules; and
a wood agitation system structed and arranged to move the plurality of units of wood below the aperture in the target area;
providing a distilled ethyl alcohol having a first proof;
providing at least one unit of wood having a plurality of capillaries containing wood sugar, the at least one unit of wood being opaque;
combining the distilled ethyl alcohol and the at least one unit of wood to provide an opaque mixture, the opaque mixture disposed within the vessel upon the platform, the opaque mixture having a surface disposed below the at least one aperture;
applying by the RF generator through the aperture, a constant RF energy at the preselected frequency, the applied constant RF energy expanding and fracturing the plurality of capillaries of the wood within the target area, the expanding and fracturing and expanded capillaries absorbing the alcohol of the distilled ethyl alcohol, the absorbed alcohol dissolving at least the wood sugars into the distilled ethyl alcohol to rapidly age the distilled ethyl alcohol; and
using the wood agitation system to cycle the units of wood disposed substantially below the aperture in a targeted application area of the constant RF energy.

10. The method of claim 9, wherein the wood agitation system is a platform rotation system structured and arranged to rotate the platform below the at least one aperture.

11. The method of claim 10, wherein the platform rotation system includes a central drive shaft extending from a center point of the platform, the driveshaft driven by an external motor.

12. The method of claim 9, wherein the wood agitation system includes a plurality of angled nozzles as part of the at least one liquid circulating system, the angled nozzles disposed proximate to the platform at an angle to induce rotational flow to the circulated liquid.

13. The method of claim 9, wherein the at least one liquid circulation system further includes at least one spray nozzle structured and arranged to spray at least a portion of the circulated liquid into the targeted application area of the constant RF energy.

14. The method of claim 9, wherein the wood agitation system is at least one sweeper fin extending from a central drive shaft disposed adjacent to the platform, the at least one sweeper fin structured and arranged to move the plurality of units of wood around on the platform.

15. The method of claim 9, wherein the ratio of distilled ethyl alcohol to the plurality of units of wood in the opaque mixture disposed within the vessel is between 2.4 oz to 4.1 oz of wood per gallon.

16. The method of claim 9, wherein after a first period of time, a quantity of water is added to the opaque mixture to provide a second proof lower than the first proof, the additional quantity of water further dissolving the wood sugars within the opaque mixture.

17. The method of claim 9, wherein the fracturing and expansion of the capillaries is due in part to localized heating of units of wood within the targeted application area by the constant RF energy.

* * * * *